United States Patent
Gareau et al.

(10) Patent No.: US 11,316,802 B2
(45) Date of Patent: *Apr. 26, 2022

(54) TIME TRANSFER SYSTEMS AND METHODS OVER A STREAM OF ETHERNET BLOCKS

(71) Applicant: Ciena Corporation, Hanover, MD (US)

(72) Inventors: Sebastien Gareau, Ottawa (CA); Marc Leclair, Gatineau (CA)

(73) Assignee: Ciena Corporation, Hanover, MD (US)

( * ) Notice: Subject to any disclaimer, the term of this patent is extended or adjusted under 35 U.S.C. 154(b) by 56 days.

This patent is subject to a terminal disclaimer.

(21) Appl. No.: 16/855,188

(22) Filed: Apr. 22, 2020

(65) Prior Publication Data
US 2020/0252350 A1    Aug. 6, 2020

Related U.S. Application Data

(63) Continuation of application No. 16/118,805, filed on Aug. 31, 2018, now Pat. No. 10,673,782, which is a continuation of application No. 14/868,603, filed on Sep. 29, 2015, now Pat. No. 10,097,480.

(51) Int. Cl.
*H04L 12/26*   (2006.01)
*H04L 49/35*   (2022.01)
*H04L 43/0864* (2022.01)
*H04L 43/106*  (2022.01)
*H04L 43/0852* (2022.01)

(52) U.S. Cl.
CPC ......... *H04L 49/35* (2013.01); *H04L 43/0858* (2013.01); *H04L 43/0864* (2013.01); *H04L 43/106* (2013.01)

(58) Field of Classification Search
CPC . H04L 49/35; H04L 43/0864; H04L 43/0858; H04L 43/106
See application file for complete search history.

(56) References Cited

U.S. PATENT DOCUMENTS

| | | | |
|---|---|---|---|
| 8,848,533 | B1 | 9/2014 | Stuart et al. |
| 8,867,913 | B2 | 10/2014 | Gareau et al. |
| 2005/0102419 | A1 | 5/2005 | Popescu et al. |
| 2010/0040369 | A1 | 2/2010 | Zhao et al. |
| 2010/0238836 | A1 | 9/2010 | Diab et al. |
| 2011/0019681 | A1 | 1/2011 | Gazier et al. |
| 2013/0051407 | A1 | 2/2013 | Fourcand |
| 2013/0266312 | A1 | 10/2013 | Prakash et al. |

(Continued)

OTHER PUBLICATIONS

Gustlin et al., "What is FlexEthernet?" Ethernet Technology Summit.

(Continued)

*Primary Examiner* — Kent Krueger
(74) *Attorney, Agent, or Firm* — Clements Bernard Baratta; Lawrence A. Baratta, Jr.; Christopher L. Bernard

(57) ABSTRACT

Time transfer systems and methods implemented in a first node steps of communicating a stream of encoded blocks with a second node; and communicating synchronization messages with the second node via a synchronization message channel in overhead associated with the stream of encoded blocks, wherein the synchronization messages are utilized for synchronization of a clock at the second node. Each block in the stream of encoded blocks can be one of a data block and an overhead block.

18 Claims, 20 Drawing Sheets

(56) References Cited

U.S. PATENT DOCUMENTS

| | | |
|---|---|---|
| 2013/0308943 A1 | 11/2013 | Young et al. |
| 2015/0055664 A1 | 2/2015 | Kanonakis et al. |
| 2016/0323164 A1 | 11/2016 | Cao |
| 2019/0199505 A1* | 6/2019 | Zhang .................. H04L 7/0008 |
| 2020/0244383 A1* | 7/2020 | He ........................... H04J 3/06 |

OTHER PUBLICATIONS

Vusirikala, "FlexEthernet (FlexE) Use Cases," TEF: The Rate Debate.

Gustlin, "FlexEthernet—Protocols and Components," XILINX All Programmable.

"FlexE Implementation Agreement—Draft 1.1," Optical Internetworking Forum, Jul. 2015.

"Architecture of Ethernet layer networks," International Telecommunication Union, Feb. 2004.

Stephen J. Trowbridge, Alcatel-Lucent USA, Mapping, of Flex Ethernet Clients over OTN, International Telecommunication Union, COM 15-C 1213-E, Study Period 2013-2016, vol. 11/15, Jun. 2015, pp. 1-7.

Marteen VISSERS, Huawei Technologies Co., Ltd., Considerations on the mapping of FlexE Client and Subrate signals into OTN, International Telecommunication Union, COM 15-C 1195-E, Study Period 2013-2016, vol. 11/15, Jun. 2015, pp. 1-13.

OIF Optical Internetworking Forum, IA OIF-MLG-02.0, Multi-Link Gearbox Implementation Agreement, Apr. 2013, pp. 1-40.

European Search Report Issued in European Application EP 16177286, dated Oct. 21, 2016.

Aug. 6, 2018 European Search Report issued for International Application No. EP18176943.

Li Xueqiao et al., "Implementation and research of hardware time stamping techniques based on IEEE1588," May 27, 2011, pp. 6-9.

Jul. 8, 2020, European Search Report for European Application No. EP 20 17 1432.

\* cited by examiner

FIG. 12

| 1 0 | 0x4B | 0x00 | 0x00 | 0x01 | 0x0 | 0x000_0000 |

Local Fault:

FIG. 13

| 1 0 | 0x4B | 0x00 | 0x00 | 0x02 | 0x0 | 0x000_0000 |

Remote Fault:

TIME TRANSFER SYSTEMS AND METHODS OVER A STREAM OF ETHERNET BLOCKS

CROSS-REFERENCE TO RELATED APPLICATIONS

The present disclosure is a continuation of U.S. patent application Ser. No. 16/118,805, filed Aug. 31, 2018, and entitled "Time transfer systems and methods over Flexible Ethernet," which is a continuation of U.S. patent application Ser. No. 14/868,603, filed Sep. 29, 2015 (now U.S. Pat. No. 10,097,480, issued Oct. 9, 2018), and entitled "Time transfer systems and methods over Flexible Ethernet," the contents of each are incorporated by reference in their entirety.

FIELD OF THE DISCLOSURE

The present disclosure generally relates to networking systems and methods. More particularly, the present disclosure relates to time transfer systems and methods over Flexible Ethernet (also referred to variously as Flex Ethernet or FlexE), namely a stream of Ethernet blocks.

BACKGROUND OF THE DISCLOSURE

Layer 1 protocols and technologies have evolved including Synchronous Optical Network (SONET)/Synchronous Digital Hierarchy (SDH) in the 1990s to Optical Transport Network (OTN) in the 2000s. SONET/SDH were synchronous protocols optimized for circuit switching and transmission. OTN evolved from SONET/SDH to provide transparency and support for Wavelength Division Multiplexing (WDM) as well as for optimized transmission of packet traffic. SONET, SDH, and OTN each have a rich suite of Operations, Administration, and Maintenance (OAM) functions and support for a wide range of services and applications. Conventionally, as OTN scales beyond 100G (B100G), there are emerging frameworks for Layer 1 functionality, namely Flexible OTN (FlexO or B100G) initiatives in the International Telecommunication Union (ITU) and Flex Ethernet in the Optical Internetworking Forum (OIF).

Traditionally, Ethernet rates were defined in steps of 10×, i.e., 10 Mb/s, 100 Mb/s, 1 Gb/s (GbE), etc. There is a wrinkle in this 10× progression where 40 Gb/s Ethernet (40 GbE) was defined. Today, there are various Ethernet rates defined, including rates in-between established rates. IEEE 802.3 standards group is discussing 2.5 Gb/s, 5 Gb/s, 25 Gb/s and other various odd rates. Specifically, different rates are established for different applications, such as wireless applications, data center group applications, data center interconnections, etc. There is an expectation that different Ethernet rates will continue as new high-volume applications require optimized solutions. Specifically, router/switch equipment and optical transmission equipment are evolving at different rates. There is a desire to support simple transport of n×Ethernet streams across a faster interface. IEEE historically defines Ethernet rates (Media Access Control (MAC) layer) with projects that also define the Physical (PHY)/Physical Medium Dependent (PMD) rates; the MAC rates and PMD rates are tied and defined together. To address evolution in Ethernet and dissociate the MAC/client rate to the PHY/PMD, Flexible Ethernet has been proposed. Note, as described herein, the terms Flexible Ethernet, Flex Ethernet, and FlexE can be used interchangeably.

In transport applications, FlexE can be used to match the flexibility of optical transmission equipment. Specifically, optical transmission equipment (e.g., Dense Wave Division Multiplexing (DWDM)) is evolving to support variable modulation formats, Forward Error Correction (FEC) schemes, baud rates, etc. DWDM equipment can support a variable line rate with the same hardware, relying on configuration and provisioning. FlexE is based on Ethernet constructs, e.g., 64b/66b encoding, recognizing the primary client being transported is Ethernet. Note, the current scope of FlexE, as described in Implementation Agreement IA #OIF-FLEXE-01.0 "Flex Ethernet Implementation Agreement—Draft 1.1" (July 2015), the contents of which are incorporated by reference, is limited to interfacing applications (e.g., bonding, subrating, and channelization). However, it may be advantageous to leverage Flexible Ethernet to augment or even replace OTN and/or FlexO in some transport and switching applications.

Currently, time transfer, such as Precision Time Protocol (PTP) over Ethernet interfaces, is outside scope of the FlexE implementation. IEEE Standard 1588-2008 for a Precision Clock Synchronization Protocol for Networked Measurement and Control Systems, the contents of which are incorporated by reference, defines a protocol for transferring time across a packet network. ITU-T developed PTP over OTN schemes using the OTN Synchronization Message Channel (OSMC) and a multiframe point of reference. IEEE 1588-2008 would typically use packet delimiting as timestamp point of reference, and then inject this timestamp at the Ethernet PHY. With FlexE, the PTP packet timestamp would have to be done at the FlexE client and would be susceptible to Constant Time Error (CTE). IEEE 1588-2008 only defines a protocol for transferring time information over a packet network. It does not address performance aspects on the time accuracy when adapting to a FlexE shim. The transfer of time over a FlexE shim can be challenging because of delays introduced by elastic First-in-First-out (FIFOs) required in adaptation and mapping schemes. Uncertainty in these delays (at start-up, after fault recovery, etc.) results in uncertainty in the transferred time. Also, FlexE clients are adapted using idles to the FlexE shim adding more uncertainty and variation.

BRIEF SUMMARY OF THE DISCLOSURE

In an embodiment, a time transfer method implemented in a first node and a non-transitory computer-readable storage medium having computer readable code stored thereon for programming a first node to perform steps are described. The steps include communicating a stream of encoded blocks with a second node; and communicating synchronization messages with the second node via a synchronization message channel in overhead associated with the stream of encoded blocks, wherein the synchronization messages are utilized for synchronization of a clock at the second node. Each block in the stream of encoded blocks can be one of a data block and an overhead block. Each block in the stream of encoded blocks can be distributed based on a calendar. The synchronization message channel can be via reserved fields in the overhead. The synchronization message channel can be via a management channel in the overhead. A timestamp point of reference for use in the synchronization messages can include a designated boundary between a pair of adjacent blocks, and wherein the designated boundary can be based on a frame structure for blocks in the stream of encoded blocks. The stream of encoded blocks can be encoded based on 64b/66b encoding. The synchronization messages can be Precision Time Protocol (PTP) messages. In another embodiment, a node includes one or more ports including a port configured to communicate with a second node; and circuitry configured to communicate a stream of encoded blocks with a second node, and communicate synchronization messages with the second node via a synchronization message channel in overhead associated with the stream of encoded blocks, wherein the synchronization messages are utilized for synchronization of a clock at the second node.

In an embodiment, a time transfer method in Flexible Ethernet (FlexE) includes, in a node supporting Flexible Ethernet (FlexE), communicating a FlexE group to an adjacent node via a FlexE shim; providing a synchronization message channel between the node and the adjacent node via FlexE overhead in the FlexE shim for the FlexE group; and exchanging synchronization messages via the synchronization message channel with the adjacent node. The synchronization messages can include Precision Time Protocol (PTP) messages. A timestamp point for a synchronization message can be a start of a FlexE frame or multi-frame boundary. The FlexE shim and the FlexE group can be utilized for the synchronization messages in lieu of a FlexE client. The time transfer method can further include receiving associated timestamp points detected by the adjacent node via one or more synchronization messages; and synchronizing a first clock associated with the node with a second clock associated with the adjacent node based on the associated timestamp points. The overhead can be encoded as a 66b block and inserted on each PHY of a FlexE group. The synchronization message channel can be inserted in FlexE shim overhead. The synchronization messages can be compliant to IEEE 1588 and variants thereof.

In another embodiment, a node providing Flexible Ethernet (FlexE) includes one or more ports providing FlexE, at least one port being communicatively coupled to an adjacent node; and circuitry configured to provide FlexE group between the node and the adjacent node via a FlexE shim, wherein a synchronization message channel is employed between the node and the adjacent node via FlexE overhead in the FlexE shim for the FlexE group and synchronization messages are exchanged via the synchronization message channel with the adjacent node. In a further embodiment, a network utilizing Flexible Ethernet (FlexE) includes a first node; and a second node, wherein the first node and the second node communicate to one another through a FlexE group via a FlexE shim, wherein a synchronization message channel is employed between the first node and the second node via FlexE overhead in the FlexE shim for the FlexE group and synchronization messages are exchanged between the first node and the second node via the synchronization message channel.

In an embodiment, a time transfer method in Flexible Ethernet (FlexE) between a first node and a second node includes detecting a timestamp point of reference in FlexE overhead including one of a boundary, a toggling bit or pattern, and a specific bit pattern, and sampling time based on detecting the timestamp point of reference, wherein the FlexE overhead is encoded as a 66b block and inserted on each PHY of a FlexE group; communicating samples of the time between the first node and the second node in the FlexE overhead; and determining a time delay between the first node and the second node based on the samples of the time.

In another embodiment, a node configured to switch a Flexible Ethernet (FlexE) client service in a network includes circuitry configured to detect a timestamp point of reference in FlexE overhead including one of a boundary, a toggling bit or pattern, and a specific bit pattern, and to sample time based on detection of the timestamp point of reference, wherein the FlexE overhead is encoded as a 66b block and inserted on each PHY of a FlexE group; circuitry configured to communicate samples of the time, with a second node, in the FlexE overhead; and circuitry configured to determine a time delay to the second node based on the samples of the time.

In a further embodiment, a node utilizing Flexible Ethernet (FlexE) and configured to determine time transfer to a second node includes circuitry configured to obtain a first time sample from the second node based on a first timestamp point of reference in FlexE overhead detected at the second node, wherein the FlexE overhead is encoded as a 66b block and inserted on each PHY of a FlexE group; circuitry configured to detect a second time sample based on a second timestamp point of reference in the FlexE overhead, wherein the first timestamp point of reference and the second timestamp point of reference include one of a boundary, a toggling bit or pattern, and a specific bit pattern in the FlexE overhead; and circuitry configured to determine a time delay to the second node based on the first time sample and the second time sample.

BRIEF DESCRIPTION OF THE DRAWINGS

The present disclosure is illustrated and described herein with reference to the various drawings, in which like reference numbers are used to denote like system components/method steps, as appropriate, and in which:

FIG. 12 is a diagram of a standard Ethernet local fault ordered set;

FIG. 13 is a diagram of an Ethernet remote fault ordered set;

DETAILED DESCRIPTION OF THE DISCLOSURE

In various embodiments, time transfer systems and methods over Flexible Ethernet are described. The required information for the transfer of precise time between two nodes or network elements is (1) a time reference point, or "significant instant" to which timing information can be related, (2) the timing information itself, and (3) a measure of the delay it takes to transfer the timing information between the nodes or network elements. The time transfer systems and methods use the FlexE shim/group for time transfer and PTP messages instead of relying on the FlexE client and convention IEEE 1588 packet techniques. For example, the time transfer systems and methods can use FlexE overhead for a synchronization message channel and FlexE frame or multi-frame boundaries as an accurate timestamp point of reference. The time transfer systems and methods support FlexE interfaces for PTP applications and minimize the uncertainty and variations (overall CTE) for systems and nodes that have FlexE interfaces. As FlexE becomes more widely deployed, the time transfer systems and methods can be implemented to support PTP applications.

Flexible Ethernet

FlexE provides a generic mechanism for supporting a variety of Ethernet Media Access Control (MAC) rates that may or may not correspond to any existing Ethernet PHY rate. This includes MAC rates that are both greater than (through bonding) and less than (through sub-rate and channelization) the Ethernet PHY (Physical Layer) rates used to carry FlexE. This can be viewed as a generalization of the Multi-Link Gearbox implementation agreements, removing the restrictions on the number of bonded PHYs (MLG2.0, for example, supports one or two 100GBASE-R PHYs) and the constraint that the client signals correspond to Ethernet rates (MLG2.0 supports only 10G and 40G clients). The Multi-Link Gearbox implementation agreements are described in IA #OIF-MLG-01.0 "Multi-link Gearbox Implementation Agreement" (May 2012) and IA #OIF-MLG-02.0 "Multi-link Gearbox Implementation Agreement" (April 2013), the contents of each are incorporated by reference.

Figure 1:
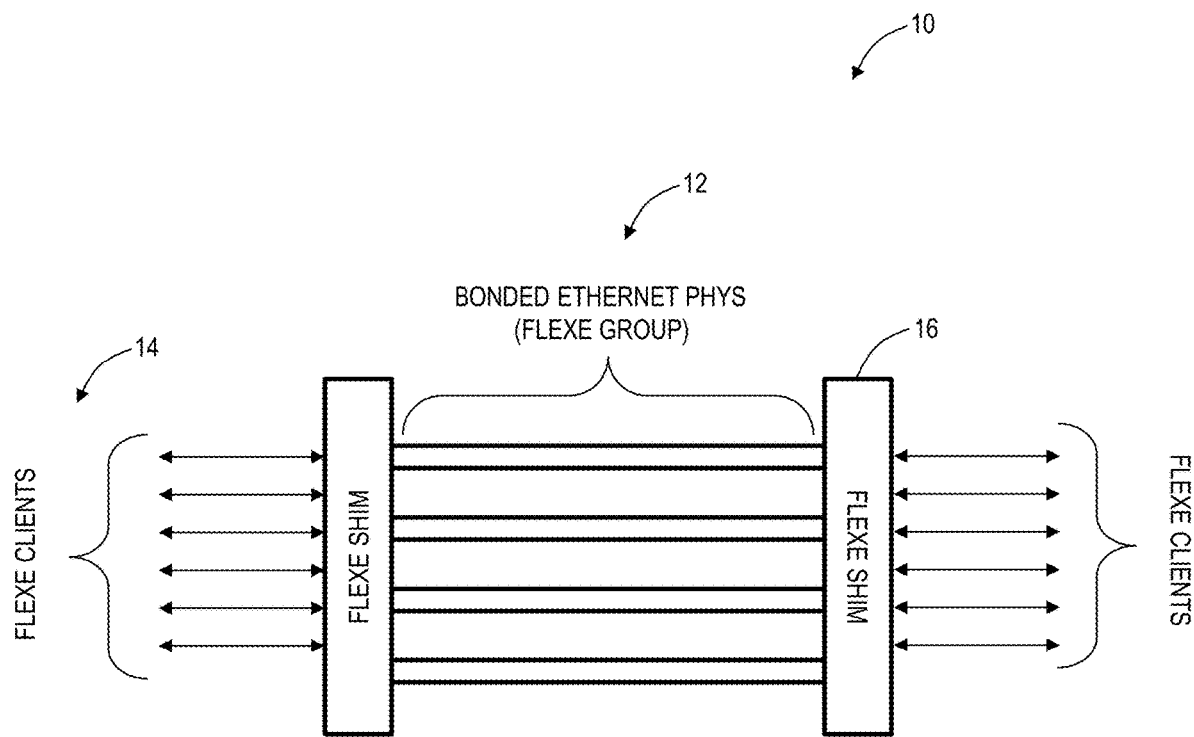
FIG. 1 is a diagram of a general structure of FlexE.

Referring to FIG. 1, in an embodiment, a diagram illustrates a general structure of FlexE 10. Again, conventionally, the general capabilities supported by the FlexE include (i) bonding of Ethernet PHYs, e.g., supporting a 200G MAC over two bonded 100GBASE-R PHYs, (ii) sub-rates of Ethernet PHYs, e.g., supporting a 50G MAC over a 100GBASE-R PHY, and (iii) channelization within a PHY or a group of bonded PHYs, e.g., support a 150G and two 25G MACs over two bonded 100GBASE-R PHYs. Note, combinations are also contemplated, for example, a sub-rate of a group of bonded PHYs, for example, a 250G MAC over three bonded 100GBASE-R PHYs.

The general structure of FlexE 10 includes a FlexE group 12, one or more FlexE clients 14, and a FlexE shim 16. The FlexE group 12 refers to a group including 1 to n bonded Ethernet PHYs. The FlexE group 12 can include one or more bonded 100GBASE-R PHYs as well as including other rates, including new, higher rates once those standards are complete. The one or more FlexE clients 14 are each an Ethernet flow based on a MAC data rate that may or may not correspond to any Ethernet PHY rate. The FlexE client 14 MAC rates supported by the current implementation agreement (IA #OIF-FLEXE-01.0) are 10, 40, and m×25 Gb/s. The FlexE shim 16 is the layer that maps or demaps the FlexE clients 14 carried over the FlexE group 12. Similar to the terminology of MLG, a FlexE mux refers to the transmit direction which maps the FlexE clients 14 over the FlexE group 12. The FlexE demux refers to the receive direction which demaps the FlexE clients 14 from the FlexE group 12.

Figure 2A:
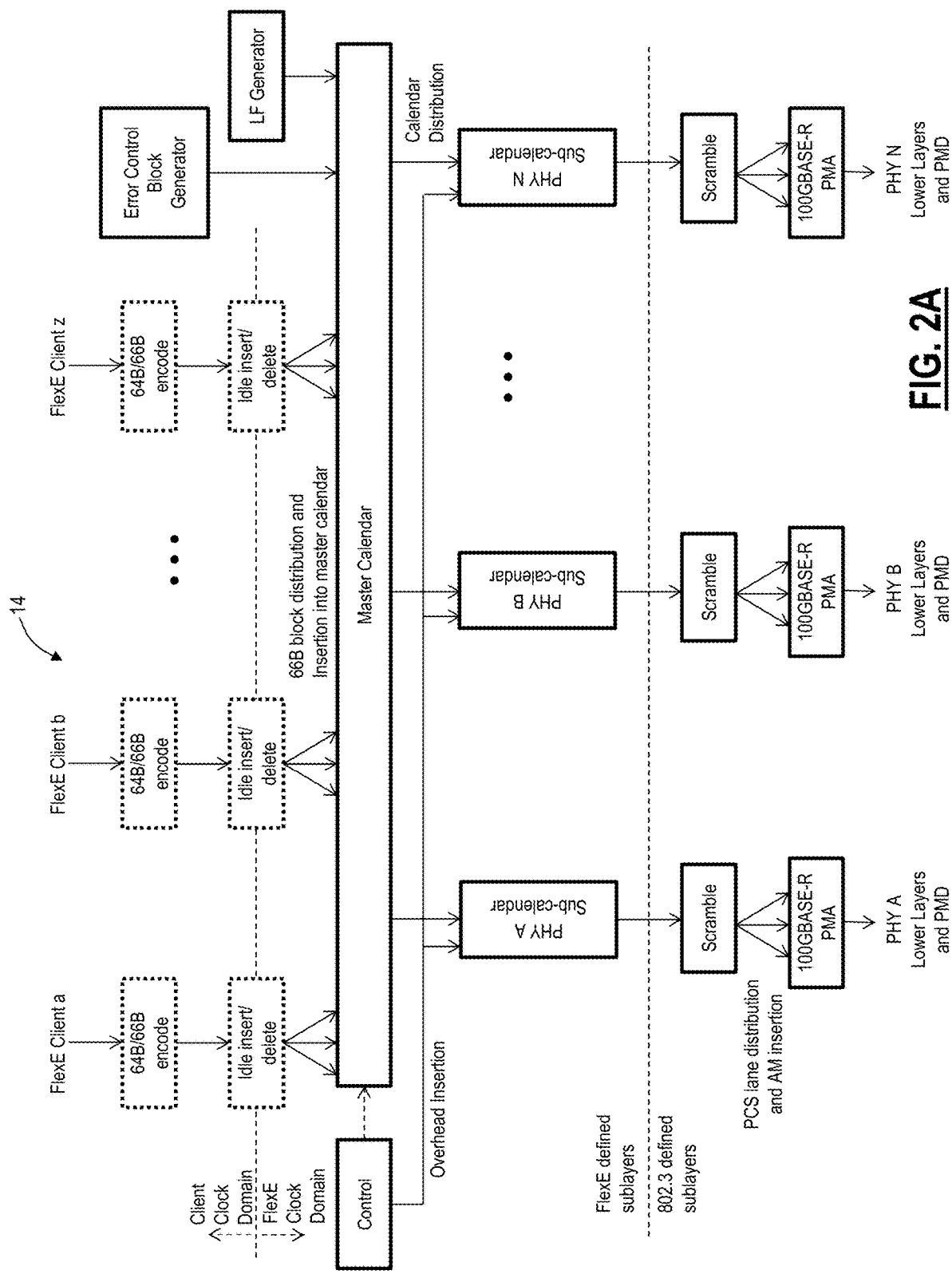
FIG. 2A is a block diagram of FlexE mux functions.
Figure 2B:
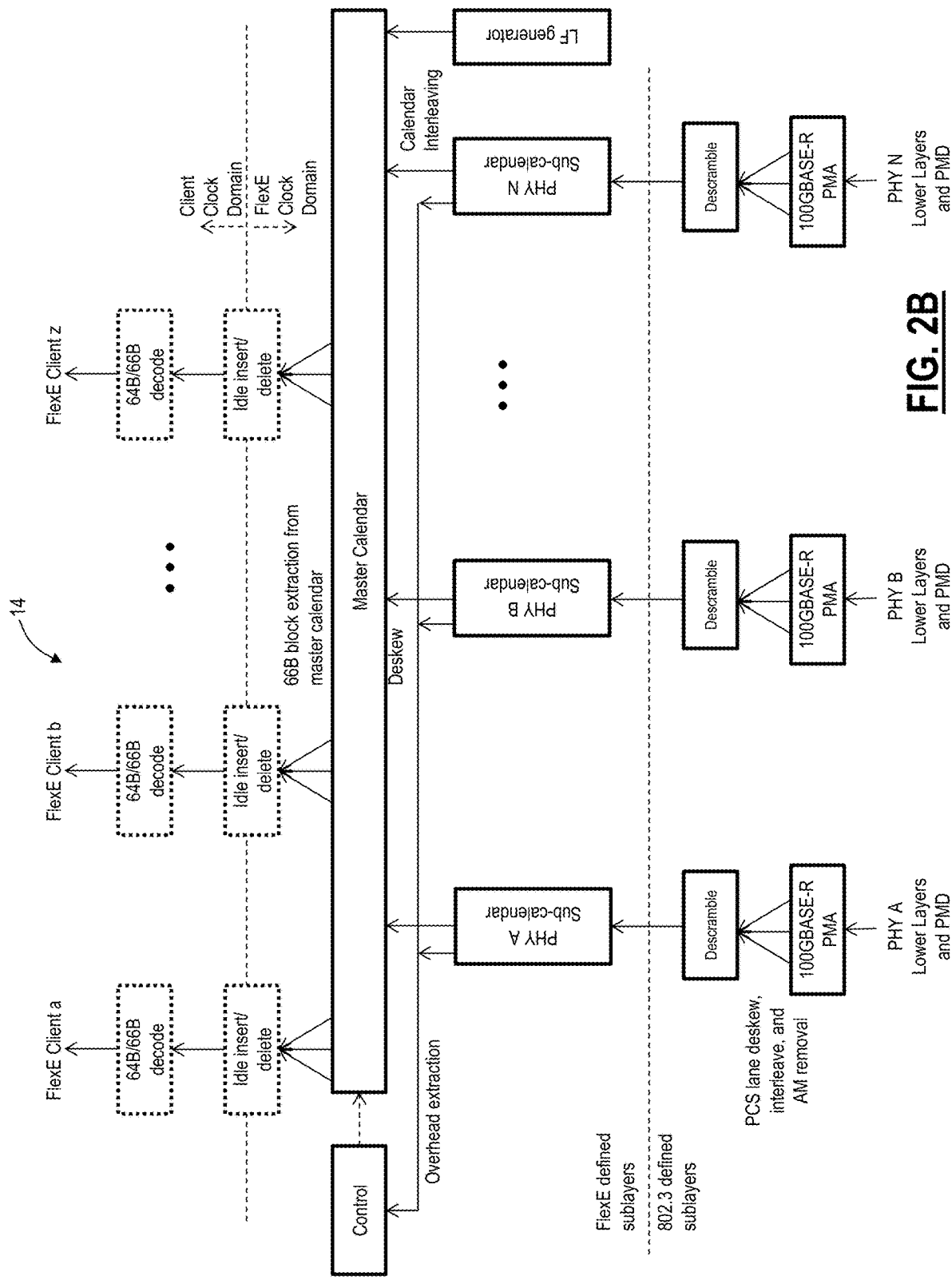
FIG. 2B is a block diagram of FlexE demux functions.

Referring to FIGS. 2A and 2B, in an embodiment, block diagrams illustrate FlexE mux functions (FIG. 2A) and FlexE demux functions (FIG. 2B). The FlexE shim 16 can be envisioned as being in the middle of the Physical Coding Sublayer (PCS) in the 100GBASE-R stack as illustrated in IEEE Std 802.3-2015 FIG. 80-1. The Media Independent Interface (MII), Reconciliation Sublayer (RS), and MAC above the FlexE shim 16 are separate for each FlexE client 14 and operate at the FlexE client rate. The layers below the PCS (100GBASE-R Physical Medium Attachment (PMA), optional FEC, PMD) are used intact as specified for Ethernet. IEEE 802.3 is a working group, and a collection of IEEE standards produced by the working group defining the physical layer and data link layer's MAC of wired Ethernet.

FIG. 2A illustrates the functions of the FlexE mux (the FlexE shim 16 functions in the transmit direction). Where the 64b/66b encode and idle insert/delete functions are performed and whether these functions are part of the FlexE mux is application specific. What is presented for insertion into the slots of the FlexE master calendar is a stream of 64b/66b encoded blocks from each client encoded per IEEE Std 802.3-2015 Table 82-4 which has been rate-matched to other clients of the same FlexE shim 16. This stream of 66b blocks might be created directly at the required rate using back-pressure from a Network Processing Unit (NPU). It might come from a single-lane Ethernet PHY such as 10G or 25G, where the process of rate-matching involves both idle insertion/deletion, plus converting the rate-aligned stream from the 4-byte alignment of IEEE Std 802.3-2015 clause 49 to the 8-byte alignment of IEEE Std 802.3-2015 clause 82. Note that the IEEE 802.3 diagrammatic convention of showing idle insertion/deletion as though this were an operation that operates on a stream of 64b/66b blocks, even though strictly speaking this may require 64b/66b decoding and recoding, particularly in the case of converting between 4-byte alignment and 8-byte alignment. The stream of blocks may come from a multi-lane Ethernet PHY, where the lanes need to be deskewed and re-interleaved with alignment markers removed prior to performing idle insertion/deletion to rate match with other clients of the same FlexE shim 16. Or the stream may have come from another FlexE shim 16, for example, connected across an OTN network, where all that is required is to perform idle insertion/deletion to rate match with other clients of the same FlexE shim 16.

The 66b blocks from each FlexE client 14 are distributed sequentially into the master calendar in the order described herein. The 66b blocks from the master calendar are distributed to each PHY of the FlexE group 12 according to the ordering described herein. The FlexE overhead is inserted into the sub-calendar of each PHY. The stream of 66b blocks of each PHY is distributed to the PCS lanes of that PHY with the insertion of alignment markers, and this is presented at the PMA service interface in the 100GBASE-R stack. Lower layers and interfaces of the 100GBASE-R Ethernet PHY (e.g., CAUI, FEC, PMA, PMD) are used as specified in IEEE Std 802.3-2015. Error Control blocks are generated for insertion into calendar slots that are unused or unavailable.

LF (Local Fault) blocks are generated for insertion into the calendar slots of any failed FlexE client.

FIG. 2B illustrates the functions of the FlexE demux (the FlexE shim 16 in the receive direction). The layers of each 100GBASE_R PHYs below the PCS are used exactly as specified in IEEE Std 802.3-2012. The PCS lanes are recovered, deskewed, reinterleaved, and the alignment markers are removed. The aggregate stream is descrambled. The calendar slots of the each PHY are logically interleaved in the order specified herein. The FlexE overhead is recovered from each PHY. In the case that any PHY of the FlexE group 12 has failed (PCS_Status=FALSE) or overhead lock or calendar lock has not been achieved on the overhead of any of the PHYs, LF is generated to be demapped from the master calendar for each FlexE PHY. The 66b blocks are extracted from the master calendar positions assigned to each FlexE client in the order described herein.

Where the Idle Insertion/Deletion, 66B Decoding functions are performed and whether they are inside or outside the FlexE is application specific. The 66b blocks could be delivered directly to an NPU. If delivered to a single-lane PHY, idle insertion/deletion may be used to increase the rate to the PHY rate, realigning to 4-byte boundaries in the process (for 10G or 25G) and recoding 64b/66b according to clause 49. For a multi-lane PHY, idle insertion/deletion is used to increase the rate to the PHY rate less the space needed for alignment markers, the blocks are distributed to PCS lanes with AM insertion. For a FlexE client mapped over OTN, idle insertion/deletion may be used to adjust the rate as required for the OTN mapping.

FlexE Applications

FlexE can support a variety of applications. A non-exhaustive list includes:

Router to Transport Connection.

Intra-Data Center "Fat Pipe" application: bonded PHYs for flows exceeding the PHY rate, or carrying traffic that doesn't distribute efficiently with LAG.

Generalized MLG for port expansion applications, e.g., an n×100G PHY as an umbilicus to a satellite shelf of lower rate ports.

Figure 3:
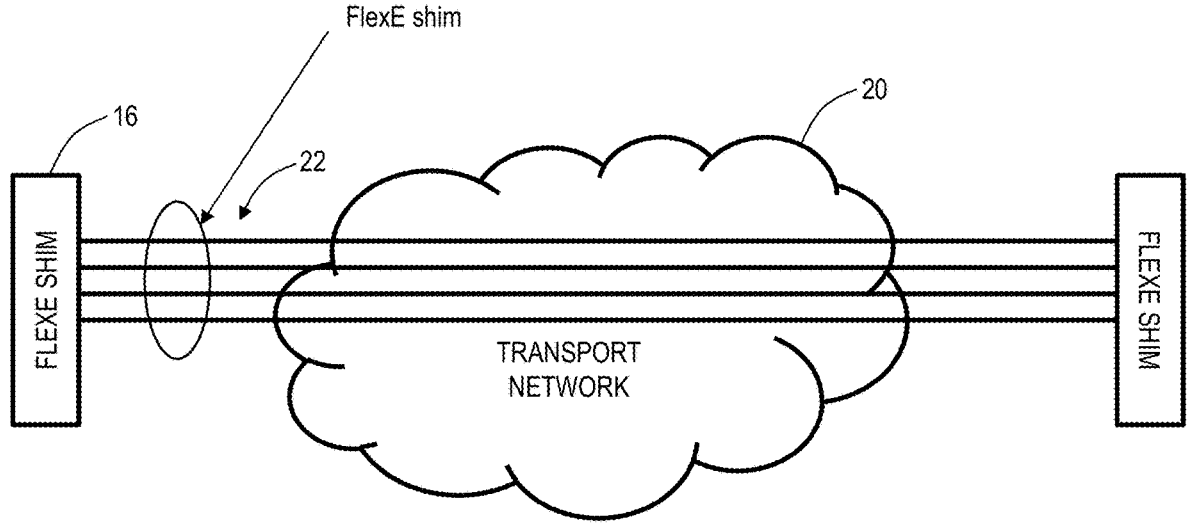
FIG. 3 is a diagram of a transport network aware or unaware of a router to transport FlexE connection.

Referring to FIG. 3, in an embodiment, a network diagram illustrates a transport network 20 unaware of a router to transport FlexE connection. In FIG. 3, the FlexE shim 16, e.g., in a router or switch, maps the FlexE client(s) 14 over a group of bonded Ethernet PHYs 22. Each of the Ethernet PHYs 22 is carried independently over the transport network 20 using a PCS codeword transparent mapping (e.g., the mapping of 100GBASE-R into Optical channel Path Unit 4 (OPU4) as described in ITU-T Recommendation G.709 clause 17.7.5). The Ethernet PHYs 22 are intended to be carried over the same fiber route. All of the PHYs 22 of the FlexE group 12 need to be interconnected between the same two FlexE shims 16. In this case, the FlexE shim 16 will need to tolerate and accommodate considerably more skew than if the FlexE shims 16 were only separated by an Ethernet link distance of 40 km or less, as the transport network 20 could carry the signal over thousands of kilometers. For the case illustrated in FIG. 3, it is the PHYs 22 of the FlexE group 12 which are carried over the transport network 20. Note, in FIG. 3, the transport network 20 is unaware of FlexE 10.

Figure 4:
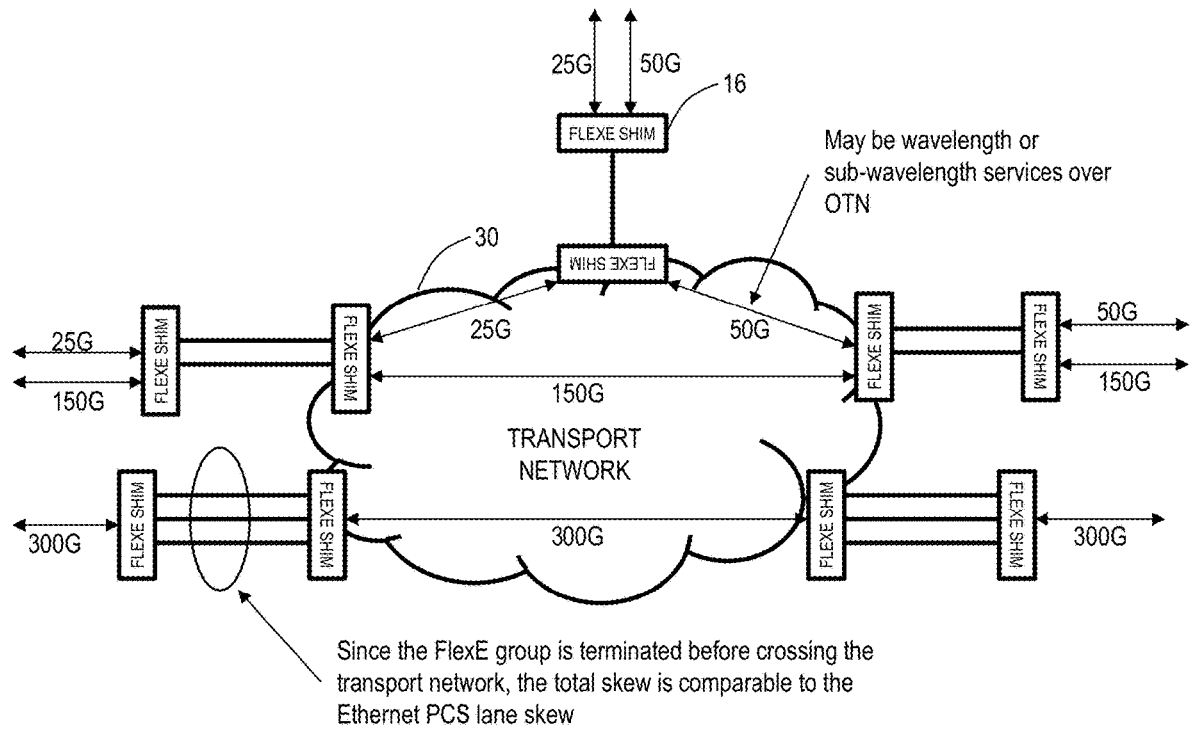
FIG. 4 is a network diagram of a transport network aware of FlexE.

Referring to FIG. 4, in an embodiment, a network diagram illustrates a transport network 30 aware of FlexE. In FIG. 4, the distance between any pair of FlexE shims 16 is limited to the Ethernet link distance (about 40 km maximum), so the amount of skew that needs to be tolerated and compensated is considerably less. The other important distinction here is that it is the FlexE clients 14 rather than the PHYs 22 of the FlexE group 12 which are carried over the transport network 30. The FlexE client 14 could be constructed to be the complete size of the payload that can be carried over a single wavelength (e.g., construct 200G to fill a Dual Polarization (DP) 16-Quadrature Amplitude Modulation (16 QAM) wavelength with the bonding of two 100GBASE-R PHYs), or could be a smaller client which is multiplexed and switched at a sub-wavelength level, using the mapping described in ITU-T Recommendation G.709 clause 17.9 to carry the FlexE client signal over an Optical channel Data Unit flex (ODUflex) Constant Bit Rate (CBR).

Figure 5:
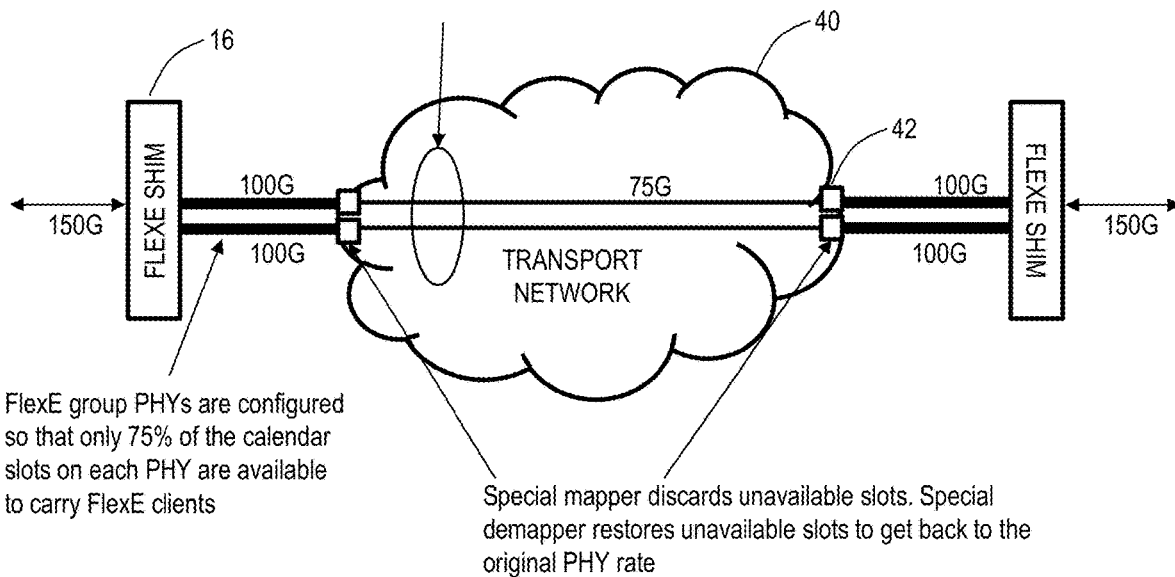
FIG. 5 is a network diagram of a transport network of an example of partial-rate transport of Ethernet PHYs of a FlexE group.

Referring to FIG. 5, in an embodiment, a network diagram illustrates a transport network 40 of an example of partial-rate transport of Ethernet PHYs 22 of a FlexE group 12. Here, the Ethernet PHY rate may be greater than the wavelength rate, and there is a reason (for example, wavelengths terminated on different line cards) that it is not desirable to terminate the FlexE shim 16 in transport equipment 42. The example illustrated here is a 150G FlexE client carried over two 75G wavelengths, but one can imagine a possible future 200GbE rate where one would want to carry a 300G FlexE client over two bonded 200GbE and be able to carry the two partially-filled Ethernet PHYs over 150G wavelengths.

FlexE Group

The FlexE group 12 includes from 1 to n 100GBASE-R Ethernet PHYs 22. Each PHY can be identified by a number in the range [1-254]. The values of 0 and 255 are reserved. A PHY number may correspond to the physical port ordering on equipment, but the FlexE shim 16 at each end of the group must identify each PHY in the group 12 using the same PHY number. PHY numbers do not need to be contiguous: even if a FlexE group 12 is composed of initially contiguous PHY numbers, this may not be preserved as PHYs are added to or removed from the group 12.

Each of these PHYs 22 uses the bulk of the PCS functions described in IEEE Std 802.3-2015 clause 82 including PCS lane distribution, lane marker insertion, alignment, and deskew. All the PHYs 22 of the FlexE group 12 must use the same physical layer clock. Each PHY 22 of the FlexE group 12 is able to deliver a logically serial stream of 64b/66b encoded blocks from the FlexE mux to the FlexE demux at a data rate of:

$$103.125 \text{ Gb/s} \times \frac{16383}{16384} \pm 100 \text{ ppm}$$

FlexE supports a value of n (number of PHYs 22 in the FlexE group 12) up to 254, although practical implementations are likely limited to the range of 4-8 PHYs 22. The fraction applied to the base rate reflects the fact that 1/16K of the space of the interface is occupied by PCS lane alignment markers which are not space available to carry the FlexE payload. The FlexE payload carried over each PHY 22 of the FlexE group 12 has the format of a logically serial stream of (mostly) legal 64b/66b blocks with the format described in IEEE Std 802.3-2015 FIG. 82-4, although the blocks do not appear in a sequence that makes sense to interpret as an Ethernet interface. The actual PHYs 22 of the FlexE group 12 may transcode these blocks to 256b/257b format according to IEEE Std 802.3-2015 clause 91.5.2.5 according to the PHY type, but they are trans-decoded back to 64b/66b blocks prior to delivery to the FlexE demux.

FlexE Client

Each FlexE client 14 is a logically serial stream of 64b/66b blocks representing an Ethernet MAC layer. The MAC layer of a FlexE client 14 may operate at a rate of 10, 40, or n×25 Gb/s. The 64b/66b encoding is according to IEEE Std 802.3-2015 FIG. 82-4. For certain cases where the FlexE client 14 originates from an Ethernet PHY, this may require conversion from the 4-byte alignment of start-of-packet for a PHY which uses the clause-49 PCS to the 8-byte alignment of FIG. 82-4 as part of the idle insertion/deletion process.

In the case where the FlexE client 14 comes from an Ethernet PHY which uses PCS lane alignment markers (e.g., 40GBASE-R), the lanes must be deskewed, re-interleaved and serialized, removing the alignment markers to produce the 64b/66b stream which is treated as a FlexE client 14. All FlexE clients 14 transmitted over the same FlexE group 12 must be aligned to a common clock. This is accomplished using idle insertion/deletion as described in IEEE Std 802.3-2015 clause 82.2.3.6. In addition, the bit-rate of each FlexE client 14 is reduced slightly from nominal as part of this process to allow room for insertion of FlexE overhead and the PCS lane alignment markers of the FlexE group 12. So the 64b/66b encoded format of a FlexE client 14 operates at a data rate of:

$$FlexE \text{ Client } MAC \text{ rate} \times \frac{66}{64} \times \frac{16383}{16384} \times \frac{20460}{20461} \pm 100 \text{ ppm}$$

This is a rate reduction slightly under 0.011%, which is well within what can be accomplished with idle insertion/deletion without packet loss. Note that this does not actually correspond to any clock that needs to be generated in an implementation, as the idle insertion-deletion process will simply operate by filling the allocated block positions in the FlexE group 12 from a FlexE client 14 First-In First-Out (FIFO) with its own deficit idle counter and inserting or deleting idles in the process of filling the block positions in the FlexE group 12 according to a FlexE calendar.

FlexE Calendar

The FlexE operates using a calendar which assigns 66b block positions on each PHY 22 of the FlexE group 12 to each of the FlexE clients 14. The calendar has a granularity of 5G and has a length of 20 slots per 100G of FlexE group 12 capacity. Two calendars are supported: an "A" and a "B" calendar. At any given time, one of the calendars is used for mapping the FlexE clients 14 into the FlexE group 12 and demapping the FlexE clients 14 from the FlexE group 12. The two calendars are provided to facilitate reconfiguration.

Figure 6:
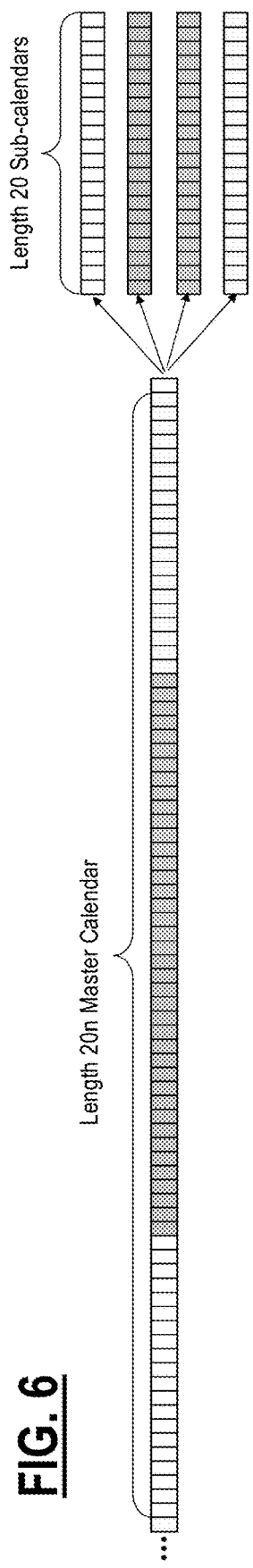
FIG. 6 is a diagram of FlexE calendar distribution.

For a FlexE group 12 including n bonded 100GBASE-R PHYs, the logical length of the master calendar is 20n. The blocks as allocated per the master calendar are distributed to n sub-calendars of length 20 on each of the PHYs of the FlexE group as shown in FIG. 6. FIG. 6 is a diagram illustrating FlexE calendar distribution. The order of distribution of twenty blocks at a time is selected over simple "round robin" distribution of 66b blocks to facilitate addition of PHYs 22 to a FlexE group 12 without the need to change the calendar slots allocated to existing FlexE clients 14. Calendar slots are identified by their PHY number and the slot [0-19] (within that PHY). The calendar slots assigned to FlexE clients 14 do not change when PHYs are added or removed from the group 12. PHYs with calendar slots assigned to FlexE clients 14 cannot be removed from the group (or all FlexE clients 14 need to be moved to other PHYs or removed BEFORE a PHY is removed from the group). The "logical" sequence number of a calendar slot is 20× the PHY number plus the calendar slot number within the PHY. The sequence is ascending order. Note that the sequence numbering is not necessarily consecutive when the assigned PHY numbers are not contiguous. This logical order only matters when calendar slots on different PHYs are assigned to the same FlexE client 14.

FlexE Overhead and Alignment

Figure 7:
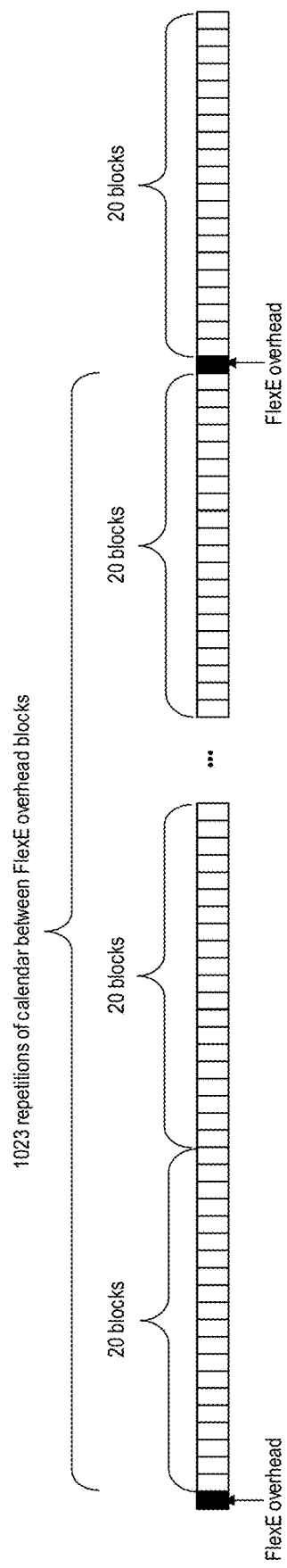
FIG. 7 is a diagram of FlexE overhead on each PHY of the FlexE group.

The alignment of the data from the PHYs 22 of the FlexE group 12 is accomplished by the insertion of FlexE overhead into a stream of 66b blocks carried over the FlexE group 12. The FlexE overhead is encoded as a 66b block which can be recognized independently of the FlexE client data. An illustration of the FlexE overhead on each PHY of the FlexE group is shown in FIG. 7.

On a 100GBASE-R PHY, a FlexE overhead block will occur approximately once per 13.1 μs. The actual format of the FlexE overhead blocks is such that they occur in a repeating sequence of four blocks, so the sequence has a period of approximately 52.4 μs. This sequence is used to align all of the PHYs 22 of the FlexE group 12 at the FlexE demux to reconstruct the sequence in the order of the master calendar so that the FlexE clients 14 can be recovered.

Figure 8:
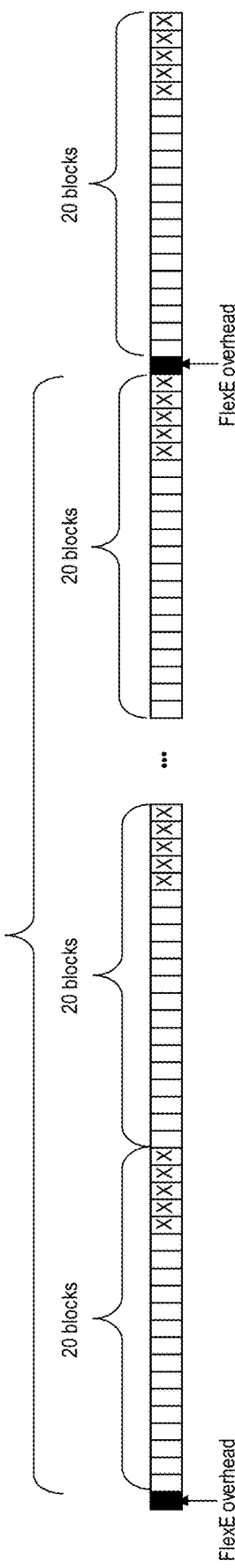
FIG. 8 is an example diagram of FlexE calendar slots where 25% of the calendar slots are unavailable.

The scenario illustrated in FIG. 5 is supported by marking a certain number of the calendar slots as unavailable. This is different from "unused", in that it is known, due to transport network constraints, that not all of the calendar slots generated from the FlexE mux will reach the FlexE demux and, therefore, no FlexE client 14 should be assigned to those slots. The intention is that when a PHY 22 of the FlexE group 12 is carried across the transport network, the mapping is able to compress the signal to less than the PHY rate by dropping the unavailable calendar slots. A case where 25% of the calendar slots are unavailable is illustrated in FIG. 8.

Figure 9:
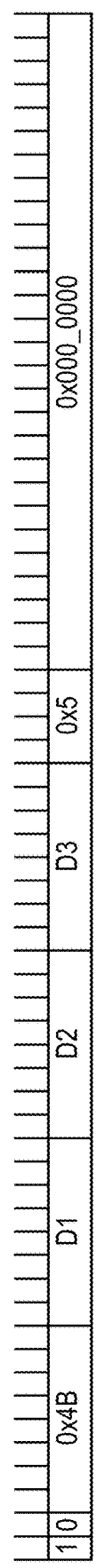
FIG. 9 is a diagram of encoding of ordered set block for FlexE overhead.

The anchor position FlexE overhead is encoded as an ordered set (control block type 0x4B). A different "O" code (Operational Code) is selected (i.e. 0x5) which is different from that for the sequence ordered set used by Ethernet or the signal ordered set used by Fibre channel. The information to be transmitted in the FlexE overhead is encoded into the bytes D1, D2, and D3 of the overhead set block is shown in FIG. 9.

The information which needs to be included in the overhead includes:

The number of PHYs 22 in the FlexE group 12;
The identity (sequence) of this PHY 22 within the FlexE group 12;
A way to transmit the programming of the calendars from the FlexE mux to the FlexE demux;
A way to indicate which calendar ("A" or "B") is in use at this time; and
A management channel. This may not be necessary in all applications (for example, if a network management system has direct access to the FlexE shim 15 at both ends of the connection), but may be useful for applications such as using FlexE for an n×100G umbilicus to a remote shelf of lower-rate ports.

Figure 10:
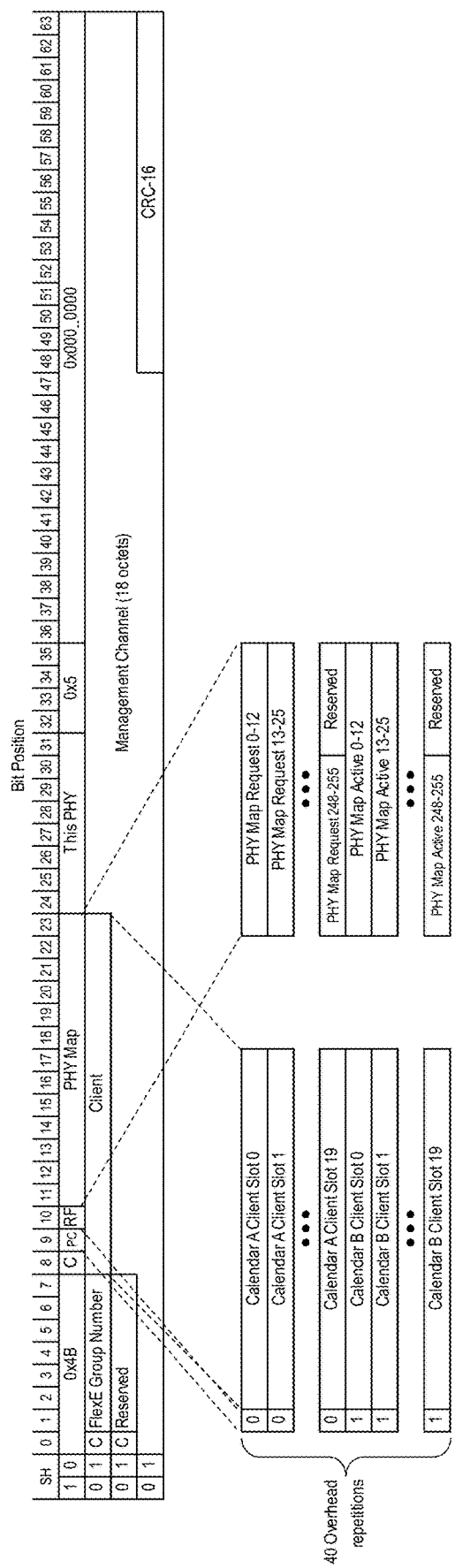
FIG. 10 is a diagram of FlexE overhead.

The amount of information to be conveyed from the FlexE mux to the FlexE demux exceeds the 24 bits available. This is addressed by spreading the relevant overhead across a sequence of four FlexE overhead blocks, each separated by 20×1023 FlexE data blocks. The encoding of the information in the sequence of four FlexE overhead blocks is illustrated in FIG. 10. The meaning, interpretation and processing of this overhead is explained in clause 7 of Contribution Number: oif2015.127.01. The first of each sequence of four FlexE overhead blocks is encoded as an ordered set as shown in FIG. 9. The next three FlexE overhead blocks are encoded as data 66b blocks at known locations based on the position of the ordered set block. The block with the higher order 2 bits of D1=00 serves as a marker to be used for alignment and re-interleaving of the sub-calendars from each of the PHYs 22 of the FlexE group 12 at the FlexE demux. The full sequence repeats once per approximately 52.4 µs. Subject to the amount of buffer provided in a given implementation, skew detection and compensation across the PHYs 22 of the FlexE group 12 can be compensated up to a bit less than half of this amount.

FlexE Group Functions

The FlexE group 12 includes from 1 to n 100GBASE-R PHYs 22. Each 100GBASE-R PHY 22 reuses nearly all of the functions as described for 100GBASE-R in IEEE Std 802.3-2015. This includes a subset of the functions of the PCS as described in clause 82, and all of the functions from sub-layers below the PCS as described in clauses 83, 86, 88, and 91-95 as appropriate according to the PHY type.

The FlexE shim 16 provides to each FlexE group PHY 22 a set of 64b/66b encoded blocks that are encoded according to FIG. 82-4 in IEEE Std 802.3-2015. Within the PCS, clause 82, each FlexE group PHY reuses (with reference to FIG. 82-2 in IEEE Std 802.3-2015) in the transmit direction, the scrambler, block distribution, and alignment insertion processes. In the receive direction, each FlexE group PHY reuses the lane block sync, alignment lock, and lane deskew (including Bit Error Rate (BER) monitor), lane reorder, alignment removal, and descrambling.

FlexE Clients

The format and standard bit rate of FlexE client 14 are described in clause 6.2 in IEEE Std 802.3-2015. However, FlexE also introduced the concept of flexible non-standard rates such as n×25G (i.e. 175G, 225G, 300G . . . ). FlexE clients 14 generally originate from one of the following sources. A FlexE client 14 may be generated internally within a system, for example from a Network Processing Unit (NPU) within a router or the like. The packet flow is generated at the determined FlexE client 14 MAC rate and 64b/66b encoded according to IEEE Std 802.3-2015 FIG. 82-4.

FlexE clients 14 at the rates of 10G, 40G, 100G, and in the future 25G and 400G can be created from an Ethernet PHY 22 at the corresponding rate with some processing to convert to the FlexE client 14 format and rate.

A 10GBASE-R signal will be converted to a 10G FlexE client signal format before presenting to a FlexE mux by using the idle insertion/deletion process as described in IEEE Std 802.3-2015 clause 82.2.3.6 (which will actually be doing idle deletion) to adapt the signal to the 10G FlexE client rate and align start of packet to an 8-byte boundary, encoding according to the 66b block format of FIG. 82-4 in IEEE Std 802.3-2015 from the received format which uses the blocks according to FIG. 49-7 in IEEE Std 802.3-2015. A 10G FlexE client signal coming from a FlexE demux can be converted to a 10GBASE-R signal format by using the idle insertion/deletion process as described in IEEE Std 802.3-2015 clause 49.2.4.7 (which will actually be doing idle insertion to compensate for the space that had been occupied by FlexE group lane alignment markers and FlexE overhead), which also aligns to 4-byte boundaries, and encodes the blocks according to FIG. 49-7 in IEEE Std 802.3-2015.

The 25GBASE-R specification is currently under development in the IEEE P802.3 by project. While the specification has not been finalized, judging from currently adopted baselines, converting a 25GBASE-R signal to a 25G FlexE client signal format is expected to involve correcting FEC errors (if FEC present), removing the FEC, removing the CWM (if present), trans-decoding to 64b/66b, and using the idle insertion/deletion process as described in IEEE Std 802.3-2015 clause 82.2.3.6 (which will actually be doing idle deletion to make room for the FlexE overhead) to adapt the signal to the 25G FlexE client rate and align start of packet to an 8-byte boundary, encoding according to the 66b block format of FIG. 82-4 in IEEE Std 802.3-2015 from the received format which uses the blocks according to FIG. 49-7 of the same standard. The conversion of a 25G FlexE client signal coming from a FlexE demux to a 25GBASE-R signal is expected to involve using the idle insertion/deletion process as described in IEEE Std 802.3-2015 clause 49.2.4.7 (which will actually be doing idle insertion to compensate for the space that had been occupied by FlexE overhead—the FlexE group lane alignment markers take the same proportion of the space as the CWM), 256b/257b transcoding, insertion of the CWM, and calculation and insertion of FEC, if appropriate.

A 40GBASE-R signal can be converted to a FlexE client 14 by serializing and deskewing the PCS lanes, removing the PCS lane alignment markers, and using the idle insertion/deletion process as described in IEEE Std 802.3-2015 clause 82.2.3.6 (which will actually be doing idle deletion to make room for the FlexE overhead) to adapt the signal to the 40G FlexE client rate. A 40G FlexE client 14 coming from a FlexE demux is converted to a 40GBASE-R interface by using the idle insertion/deletion process as described in IEEE Std 802.3-2015 clause 82.2.3.6 (which in this direction is generally doing idle insertion to restore the nominal bit-rate after removal of FlexE overhead), distributing the blocks round-robin to the four PCS lanes, and inserting PCS lane alignment markers.

A 100GBASE-R signal without FEC can be converted to and from a FlexE client 14 in the same manner as 40GBASE-R described above (except that the number of PCS lanes is 20 rather than 4). A 100GBASE-R signal with FEC, in converting to a FlexE client 14, also will correct any errors per the FEC code, remove the FEC, and trans-decode from 256b/257b prior to the idle insertion/deletion process. To convert a 100G FlexE client 14 coming from a FlexE demux to a 100GBASE-R signal with FEC involves the same processes as for 40GBASE-R, but in addition, transcoding the signal to 256b/257b, inserting the FEC lane alignment markers, and adding the FEC.

400GBASE-R is currently under development in the P802.3bs task force. This standard is not complete, but the process of converting to and from a 400G FlexE client 14 is expected to be similar to that for converting a 100GBASE-R client with FEC to and from a 100G FlexE client 14.

A FlexE client might come from another FlexE shim. In the case of transport network equipment which implements the FlexE shim 16, FlexE clients 14 can be delivered from the FlexE shim 16 at the transport network ingress to another FlexE shim at the transport network egress. The FlexE flow as a sequence of 64b/66b encoded blocks is expected to be carried over the transport network without packet loss. As no timing information is carried by this stream, idle insertion or padding is possible in the mapping over the transport network. The FlexE shim 16 at the network egress will only need to perform idle insertion/deletion according to IEEE Std 802.3-2015 clause 82.2.3.6, not due to any expected change in the nominal bit-rate, but simply to align the clock with that of the other FlexE clients 14 for the same shim.

Interconnect Flexibility

Note that since the format of the FlexE client 14 is simply a logically serial stream of 66b blocks at a given rate, FlexE clients 14 do not need to be produced or received in the same manner at both ends of the connection. For example, a 10G, 25G, or 40G FlexE client 14 might be generated as a system internal signal in the main chassis of a system, connected using an n×100G FlexE umbilicus to a satellite shelf, and connected to physical 10GBASE-R, 25GBASE-R, and 40GBASE-R ports on the satellite shelf. In the case where the FlexE mux is receiving a FlexE client 14 from a physical Ethernet port and the FlexE demux is delivering that FlexE client 14 to a physical Ethernet port, the two ports obviously have to be the same rate, but they do not have to be the same PHY type.

FlexE Overhead

The format of the FlexE overhead is indicated in FIG. 10. The FlexE overhead is encoded as a 66b block and is inserted on each PHY 22 of the FlexE group 12. One overhead block is inserted after every 1023 iterations of the length 20 calendar of FlexE data blocks, so the sequence is one block of overhead followed by 1023×20 blocks of data followed by one block of overhead.

A FlexE overhead lock is achieved at the receiver (FlexE demux) by recognizing the FlexE "O" code used to send the first of every four FlexE overhead blocks, so the sync header is 10, the control block type is 0x4B (ordered set), and the "O" code is 0x5. Once FlexE overhead lock is achieved, the next expected FlexE overhead will be 1023×20+1 block positions later. While in FlexE overhead lock, bytes D1-D3 of the ordered set block, plus the data blocks occurring at 66B block positions 20461, 40922, and 122766 blocks beyond the ordered set block will be interpreted as FlexE overhead multiframe. FlexE overhead is not interpreted if not in FlexE overhead lock. FlexE overhead lock will be lost if the sync header, control block type, or O code do not match at the expected position for 5 occurrences.

Calendar

There are two calendars for each PHY 22 of the FlexE group 12: the "A" calendar (encoded as 0) and the "B" calendar (encoded as one). The two calendars are used to facilitate hitless reconfiguration. Normally, changes are only made to the calendar which is not currently in use. Exceptions would include initial link configuration or replacement of a failed circuit pack where it is necessary to download the calendar information into the replacement pack.

The calendar in use is signaled from the FlexE mux to the FlexE demux in bit position 2 of the first three of the four codewords in the FlexE multiframe sequence. While most of the FlexE overhead can be reliably protected by the Cyclic Redundancy Check (CRC), the calendar in use must be interpreted even if the CRC is bad, since the FlexE demux must switch its calendar in use at precisely the same multiframe boundary as the FlexE mux. So that this can be done reliably, three copies of the calendar in use are transmitted and interpreted by the receiver by majority vote. Since the three copies are separated into different FlexE overhead blocks across the multiframe (1,351,704 bits apart from each other), the different copies will never be affected by the same burst error. Since each PHY should have a BER of $10^{-12}$ or better, the probability of two instances of the calendar in use being wrong is no more than $10^{-24}$, which can safely be ignored.

When the calendar in use changes from a 0 to a 1, or from a 1 to a zero, the calendar used by both the FlexE mux and the FlexE demux will be changed beginning with the first FlexE data block of the next FlexE overhead ordered set block.

The set of PHYs 22 in the FlexE group 12 (not necessarily consecutive) are indicated in the "PHY Map Active" portion of the PHY Map field of the FlexE overhead, distributed over the same group of forty sets of four blocks of FlexE overhead as are used to transmit the contents of the two calendars as described herein. The identity of this PHY 22 in the FlexE group (from 1 to n) is encoded in the D3 byte of the FlexE overhead ordered set block. Note that this is persistent information which does not change frequently. The receiver accepts a value for "This PHY" when seen identically for the second time in frames with a good CRC, and updates to the PHY map bit map are accepted from frames with good CRC. The "PHY Map Request" bits of the PHY map are used for a protocol for the addition and removal of PHYs from the FlexE server group as described herein.

The contents of both the A and B calendar are transmitted continuously from the FlexE mux to the FlexE demux, with one calendar slot being programmed in each multiframe of the FlexE overhead. The PC bit indicates which calendar (0=the "A" calendar and 1=the "B" calendar). All slots of the A calendar are programmed (20 multiframes, one for each slot), followed by all slots of the B calendar (20 multiframes). The PC bit will be equal to 0 for the twenty multiframes for programming of the "A" calendar, and equal to 1 for the twenty multiframes for programming of the "B" calendar. The receiver (FlexE demux) achieves calendar lock when the PC bit changes from 0 to 1 or from 1 to 0 in consecutive multiframes with a good CRC. The receiver loses calendar lock if the expected value of the PC bit is wrong in a multiframe with a good CRC.

The calendar is programmed in the same order as the calendar is in the frame from slots 0 to 19, starting with the first multiframe where PC=0 (or is expected to be zero while in calendar lock) for the A calendar and the first multiframe where PC=1 (or is expected to be 1 while in calendar lock) for the B calendar.

The Client field indicates which of the FlexE clients is mapped into a given calendar slot. The size of a given FlexE client can be calculated based on the number of calendar slots that client is assigned to. The Client is a 16-bit field transmitted in the $2^{nd}$ and $3^{rd}$ octets in the second "row" of the multiframe (the first data block after the ordered set). The value 0x000 indicates a calendar slot which is unused (but available). The value 0xFFFF (all ones) indicates a calendar slot which is unavailable, for the case indicated in FIG. 5 where the full FlexE group PHY rate cannot be carried over the transport network.

Calendar slot assignment changes are ignored while not in Calendar lock. Any change to which client is mapped into a calendar slot is ignored in a frame with a bad CRC. The full contents of both calendars are transmitted from the FlexE mux to the FlexE demux approximately once every 2 ms. The fact that the calendars are transmitted continuously avoids an inconsistency between the calendars at the FlexE mux and the FlexE demux due to a lost message.

The normal process of reconfiguration (e.g., adding new FlexE clients 14 to the FlexE group 12 or resizing a FlexE client 14) will involve programming the new configuration into the calendar which is not in use, then switching to the updated calendar, and finally updating the original calendar. The FlexE mux should wait for at least 3 cycles of transmission of the full calendar after the last update before switching the updated calendar to be the new calendar in use as described in clause 7.3.2 in IEEE Std 802.3-2015. This provides a vanishingly small probability that a calendar update has not been successfully received without requiring an Acknowledgment (ACK).

Management Channel

Certain applications may require the use of a management channel between the FlexE mux and the FlexE demux. The management channel may not be required for an application where a single management system or controller has access to the FlexE shims 16 on both ends of the FlexE group 12, but certain applications such as using FlexE for an n×100G umbilicus to a remote shelf may use the management channel for communication with the controller in the remote shelf for configuration, alarming, software update, etc. When the management channel is not used, it is transmitted as zeros before scrambling The format of the management channel is not specified and is application specific. The management channel occupies 18 bytes of each FlexE overhead multiframe. The total capacity of the management channel is approximately 2.749 Mb/s.

Each PHY 22 of the FlexE group can carry its own management channel. The management channels are not aggregated across the FlexE group to keep open the possibility to pass back remote failure indications, for example, losing one of the PHYs 22 of the FlexE group 12. Most likely protocols that would be carried over this type of channel would be message oriented and would have some sort of frame check sequence on each packet, and therefore not require marking bytes of the management channel as bad if the CRC on the FlexE overhead is bad.

FlexE Group Number

For some applications, it may be desirable to be able to distinguish one FlexE group 12 from another: for example, an 8-port device which is capable of being provisioned as a single 8-port group or two 4-port groups may create a situation where the PHY numbers could overlap between different groups. For such a situation, a 7-bit FlexE group number is provided which allows for checking that the correct PHY 22 is being received from the correct group number. When this field is used, it must be provisioned to the same value in both directions. When a non-zero value is provisioned, the received group number will be checked against the provisioned group number, and any mismatch will be alarmed to indicate the misconnection.

Reserved Bits 18 bits per FlexE overhead multiframe are reserved for possible future extensions to this implementation agreement. The reserved bits shall be transmitted as zero before scrambling. An implementation could choose to treat receipt of non-zero in the reserved bits in a multi-frame with a good CRC as a minor alarm, as it could indicate interconnection with a future version of this implementation agreement that is not known to be interoperable. An implementation could also choose to ignore these bits on receipt and leave the responsibility to an implementation of a newer version of the implementation agreement to recognize receipt of zeros as an indication of interconnection with an older version, and presumably the newer version knows whether it is interoperable with the older version.

CRC-16

Primarily to avoid corrupting the content of the calendars in the presence of bit errors, the FlexE overhead is protected by a CRC. The CRC is calculated over the following bits across the four rows of the FlexE overhead multiframe (in the order transmitted and received, not the order described):

The D1, D2, and D3 bytes of the ordered set overhead block

All eight octets after the sync header of the $2^{nd}$ and $3^{rd}$ overhead data blocks The first six octets after the sync header of the $4^{th}$ overhead data block.

The CRC is calculated using the polynomial $x^{16}+x^{12}+x^5+1$. This value is inserted by the FlexE mux into the transmitted overhead. It is calculated by the FlexE demux over the same set of bits and compared to the received value. Various overhead described in the previous clauses is either accepted or ignored based on whether the CRC matches the expected value.

FlexE Mux Data Flow

The FlexE Mux creates a logically serial stream of 66b blocks by interleaving FlexE client signals, according to a master calendar of length 20n slots for a FlexE group including n 100GBASE-R PHYs. Each slot corresponds to 5G of bandwidth. A FlexE client is assigned a number of slots according to its bandwidth divided by 5G. The master calendar is distributed as described earlier in FIG. 6.

Figure 11:
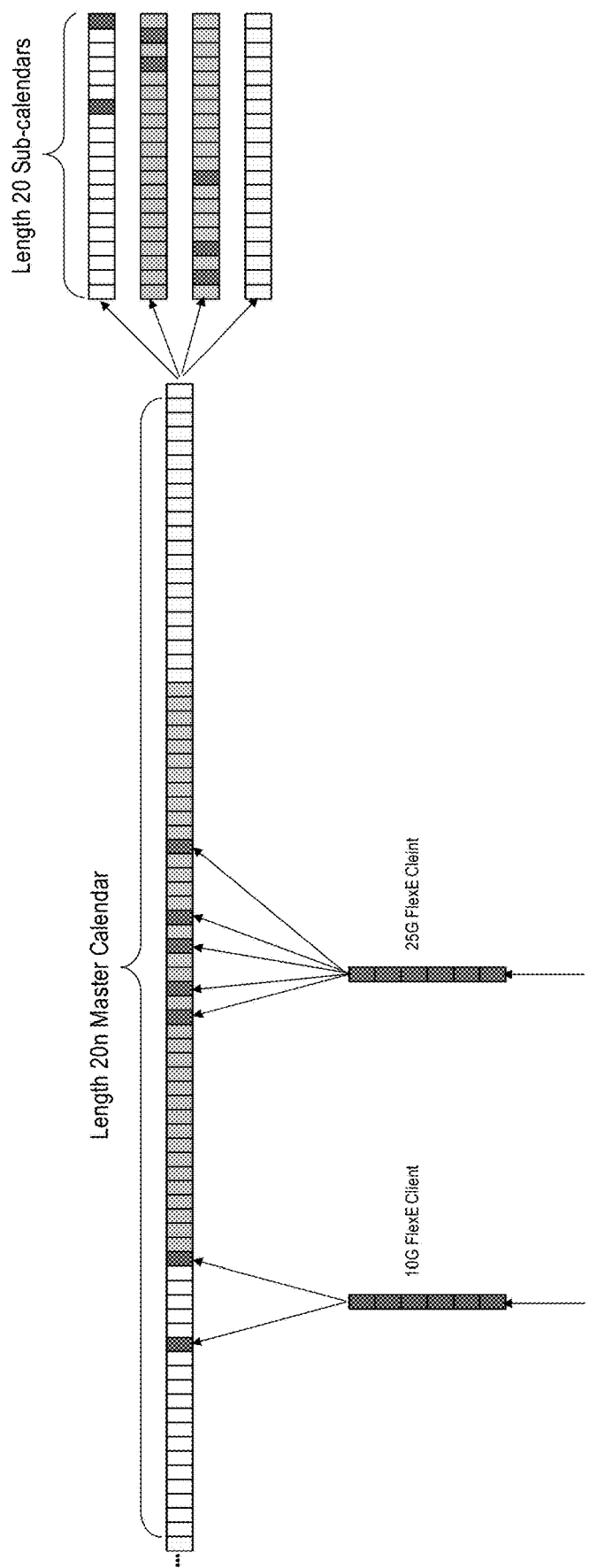
FIG. 11 is a diagram of data flow and interleaving for a FlexE client mux in calendar slots.

FIG. 11 presents an example of insertion of different bandwidth FlexE clients 14 into a logical master calendar. The slots assigned to a particular FlexE client 14 do not all need to be on the same PHY 22 of the FlexE group 12, and new clients 14 can be added as long as there are sufficient slots available. Any slot in the master calendar which is either "unassigned" or "unavailable" will be filled with Ethernet Error control blocks with the format given in FIG. 12. This ensures that any error in calendar slot assignment cannot appear to the FlexE demux as valid FlexE client data. Any incoming FlexE client 14 which has failed (e.g., one created from a physical Ethernet signal where the signal has failed, or failure to achieve block lock) will cause the slots assigned to that FlexE client 14 to be filled with Ethernet Local Fault ordered sets with the format as given in FIG. 13.

These rules allow for the creation of the complete data sequence on each PHY 22 of the FlexE group 12. The FlexE overhead is inserted onto each FlexE group PHY after every 1023 repetitions of the calendar sequence in the same relative position to the calendar sequence on every PHY 22. This provides a marker which allows the data from the different PHYs 22 of the FlexE group 12 to be re-interleaved in the original sequence so that the FlexE clients 14 can be extracted. The 66b block stream is then converted into the format for the individual FlexE group PHY, which includes block distribution and alignment marker insertion, along with (if applicable) 256b/257b transcoding and FEC calculation and insertion.

FlexE Demux Data Flow

Figure 14:
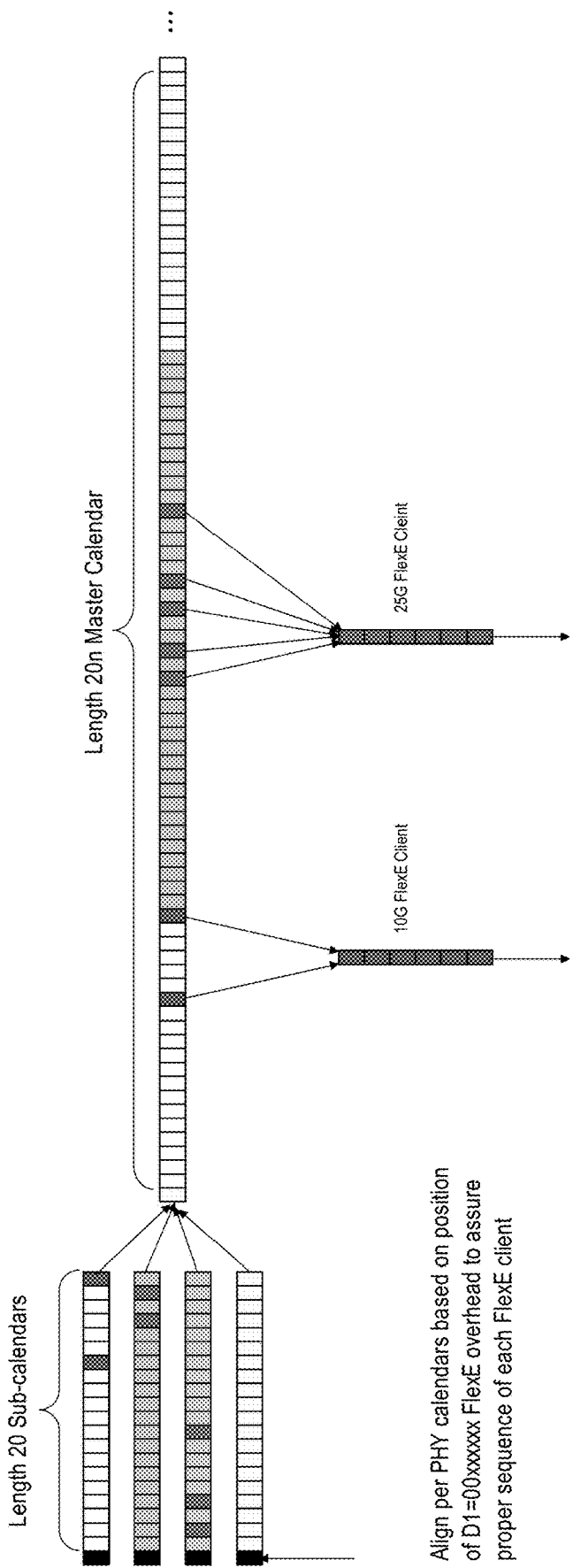
FIG. 14 is a diagram of data flow and de-interleaving for a FlexE client demux in calendar slots.

The FlexE Demux operates on a sequence of 66b blocks received from each PHY 22 of the FlexE group 12. Recovering this sequence of blocks includes (if applicable), FEC error correction and FEC remove and trans-decoding to 64b/66b, PCS or FEC lane alignment, reinterleaving, and alignment marker removal. Once this has occurred, the PHYs 22 of the FlexE group 12 are re-interleaved so that FlexE clients 14 can be recovered as illustrated in FIG. 14. Note that the FlexE overhead multiframe repeats on a cycle of approximately 52.4 µs, which allows measuring skew differences between PHYs 22 of the FlexE group 12 of approximately ±25 µs.

Skew Tolerance Requirements

The amount of skew to be expected between the PHYs 22 of the FlexE group 12 are application specific. Skew requirements are specified for two classes of applications—low skew and high skew applications. Low Skew Applications include intra-data-center applications, plus those transport network applications where the FlexE shim 16 is implemented in the transport equipment, and the FlexE clients 14 rather than the PHYs 22 of the FlexE group 12 are carried across the transport network. The skew tolerance requirement for low skew applications is 300 ns. Note that the intra-PCS-lane skew tolerance requirement for 100GBASE-R is 49 ns. A larger skew budget is established for FlexE applications of similar reach to account for the fact that the PCS lane deskew is not synchronized across the PHYs 22 of the FlexE group 12, and there may be other variation, such as cable length, or even heterogeneous 100GBASE-R PHY types which are not present in a single 100GBASE-R interface.

High Skew Applications include transport network applications where the PHYs 22 of the FlexE group 12 rather than the FlexE clients 14 are carried over the transport network (FlexE unaware transport). The skew tolerance requirement for high skew applications is 10 µs. This is established to account for about 6 µs of dispersion-related skew if the PHYs are mapped over lambdas at opposite ends of the "C" band over large distances (e.g., trans-pacific), with extra margin for things like split-band amplifiers and patch cords or the processing time to crunch and uncrunch the signal in the case where not all of the calendar slots can be carried over the transport network connection.

If the intra-PHY skew exceeds the skew tolerance, the FlexE clients 14 will not be demapped from the incoming PHYs 22, but will be sent continuous Ethernet Local Fault Ordered sets as illustrated in FIG. 13 at the FlexE client rate. If one or more of the PHYs 22 of the FlexE group 12 has failed (e.g., loss of signal, failure to achieve block lock or alignment lock, high BER, or any other condition that results in PCS_Status=FALSE), the FlexE clients 14 will be sent continuous Ethernet Local Fault Ordered sets as illustrated in FIG. 13 at the FlexE client rate. In addition, when one or more of the PHYs 22 of the FlexE group 12 have failed continuous remote fault ordered sets will be sent back over the FlexE group 12 in the calendar slots assigned to any FlexE clients 14, and the RF bit will be set in the FlexE overhead of every PHY in the FlexE group toward the far-end shim.

Addition and Removal of PHYs from a FlexE Group

In general, only one PHY 22 should be added to or removed from a FlexE group 12 at a time. An added PHY 22 begins with all of its calendar slots (except those provisioned as unavailable) as unused. Prior to removing a PHY 22, all clients must be removed from all of its calendar slots in both the "A" and the "B" calendar, i.e., all calendar slots which are not provisioned as "unavailable" will be "unused". Addition and removal of PHYs does not change the (PHY,slot) identifier for any calendar slot on any other PHY, and does not change the order of calendar slots assigned to any currently provisioned FlexE client 14.

Addition and removal of PHYs are controlled by the "PHY map active" and "PHY map request" fields of the FlexE overhead. Changes to either of these fields are only accepted from overhead multiframes with a good CRC. These fields are sent identically on every current PHY of the FlexE group. The receiver may choose to receive these fields from multiple PHYs (so if a CRC is bad on one PHY, it receives it from another), or may choose to receive the overhead from only one PHY and rely on the fact that the overhead is repeated in a continuous cycle to receive eventually updates through repetition.

Whether the PHY addition procedure to add a new PHY to the group is initiated from one or both ends is application dependent. The new PHY might be added at both ends by the management or control system, or one end might be the master and the other the slave, with the slave echoing back the PHY addition request initiated by the master. The initiation procedure begins by changing the bit position in the "PHY map request field" from a zero to a one, bringing up the new PHY, and transmitting the FlexE overhead on the PHY to be added.

The PHY is considered added once the following conditions are met:
  The far end has also changed the bit position for the PHY to be added from zero to one in the "PHY map request" field.
  PCS_status=TRUE for the PHY to be added (no Loss of Signal (LOS), block lock and AM lock have been achieved on every PCS lane, no hi_ber).
  FlexE overhead lock and calendar lock are achieved on the added PHY, the expected value is being received in the "This PHY" field, and the FlexE overhead being received is within the skew tolerance with the rest of the FlexE group.

Once these conditions are met, the bit position corresponding to the added PHY is changed from a zero to a one in the "PHY map active" field. FlexE clients 14 may not be assigned to the newly added PHY until both the near end and the far end are indicating a one in the "PHY map active" field for the new PHY.

For PHY removal, all FlexE clients 14 must be removed from the A and the B calendars on a PHY before it can be removed. Any calendar slot not provisioned as "unavailable" must be "unused" in both calendars on the PHY. Whether the initiation procedure occurs from one or both ends is implementation dependent—both ends could be configured, or the controller at the far end could echo back the near end request in a master/slave configuration. The procedure begins by changing the PHY Map Request bit corresponding to the PHY to be deleted from a one to a zero. After the near end has changed the PHY Map Request bit to a zero, when the far end also has changed its PHY Map Request bit to a zero, the near end changes its PHY Map Active bit to a zero. The PHY is considered deleted once a zero is being received in the PHY Map Active bit from the far end. The FlexE overhead continues to be sent on the PHY being deleted until the far end is indicating zero in its PHY Map Active bit corresponding to the PHY.

FlexE Management

For FlexE group management, the control variables are the number of PHYs 22 in the FlexE group. The status variables are PHY_align—True if all PHYs in the FlexE group are being received and are within the skew tolerance of the implementation. False if one or more of the incoming PHYs has failed or if the inter-PHY skew exceeds the skew tolerance of the implementation.

For FlexE group management, per PHY, note that all 100GBASE-R control and status variables in or below the PCS are applicable to each PHY of the FlexE group 12.

Control Variables:
  PHY number (within the FlexE Group)
  Number of available Calendar Slots (20 except when entire PHY can't be carried across the transport network)
  Mux_Calendar_A[0 . . . 19] and Mux_Calendar_B[0 . . . 19] The FlexE client that is mapped into each of the respective calendar slots in the transmit direction. The initial default for all calendar slots is UNUSED, except in the case where the number of available calendar slots is less than 20, in which case the first AVAILABLE number of slots default to UNUSED and the rest default to UNAVAILABLE.

Tx_Calander_in_use—Indicates whether the A or the B calendar is currently active.

Status Variables

Demux_Calendar_A[0 . . . 19] and Demux_Calendar_B [0 . . . 19] The FlexE client that the far end has mapped into each of the calendar slots in the received direction. The initial default for all calendar slots (prior to information received from the far end) is UNUSED, except in the case where the number of available calendar slots is less than 20, in which case the first AVAILABLE number of slots default to UNUSED and the rest default to UNAVAILABLE.

Rx_Calendar_in_use—Indicates the calendar being used at the current time by the far end.

Transport Network Mappings for Flex Ethernet Signals

Three different methods of mapping of FlexE signals over transport networks are possible. The case of FlexE unaware transport involves the transport network mapping each of the Ethernet PHYs independently over the transport network using a PCS codeword transparent mapping. Since the FlexE mux and FlexE demux are separated by transport network distances, this requires a "high skew" implementation of the FlexE shim 16.

Note that certain existing OTN mappers/demappers are not fully PCS codeword transparent with respect to LF and RF ordered sets, and may mistake an LF or RF sent for an individual FlexE client as an LF or RF for the entire link and bring the link down. This is not an issue in the case of FlexE unaware transport of simple bonding to carry a larger rate flow, as a failure of the single high-rate FlexE client is equivalent to a failure of the group. But it may be an issue if FlexE unaware transport is used to carry a group of multiple lower-rate FlexE client services using less than fully PCS codeword transparent mappings.

The next case is where the FlexE shim 16 is implemented in the transport network equipment, and rather than carrying the PHYs 22 of the FlexE group 12 over the transport network, the FlexE clients 14 are carried over the transport network. The 64b/66b encoded FlexE client rate is:

$$FlexE\ Client\ MAC\ rate \times \frac{66}{64} \times \frac{16383}{16384} \times \frac{20460}{20461} \pm 100\ ppm$$

Note that while this is the stream of blocks presented to the transport network from the FlexE shim 16 to be carried, since this stream does not have any timing information, the transport network is not required to signal at this rate: idle insertion/deletion or padding may be used in the mapping specified by ITU-T if it provides a more convenient rate for the transport.

When a FlexE client 14 is mapped in this manner, it may be connected at the OTN egress to another FlexE shim 16 where it will be clock aligned with other FlexE clients 14 carried over the same FlexE group 12. It may also be connected to an Ethernet PHY 22 with the same nominal MAC rate as the FlexE client 14 using the appropriate conversion as described herein.

Note that in the case where it is necessary to connect a FlexE client 14 to an Ethernet PHY 22 across an OTN where the Ethernet PHY 22 uses a legacy mapper/demapper, it may be necessary to perform the conversion of the FlexE client 14 to the Ethernet PHY format according to clause 7.2.2 immediately after the FlexE shim 16 and to map the FlexE client 14 over OTN as if it were an Ethernet PHY 22 of the corresponding rate. This second case can use a "low skew" implementation of the FlexE shim 16 as described herein.

The third case is where the FlexE shim 16 is not terminated in the transport network equipment, but the transport network equipment "crunches" the PHY 22 of the FlexE group 12 by discarding unavailable calendar slots at the transport network ingress and re-inserting them at the transport network egress. The mapping of this requires serializing and deskewing the PCS lanes of the PHY, then discarding all "UNAVAILABLE" calendar slots from the structure to reduce the bit-rate. For example, if only 15 of 20 calendar slots are available, there are effectively 1023 repetitions of a length 15 calendar after discarding the unavailable slots. At the transport network egress, the unavailable slots are restored to the FlexE PHY stream of 66b blocks (inserting error control blocks as illustrated in FIG. 12. The net bit-rate of this reduced-rate flow when there are "n" available calendar slots is:

$$103.125\ Gb/s \times \frac{16383}{16384} \times \frac{1 + 1023n}{20461} \pm 100\ ppm$$

FlexO and FlexE

Figure 15:
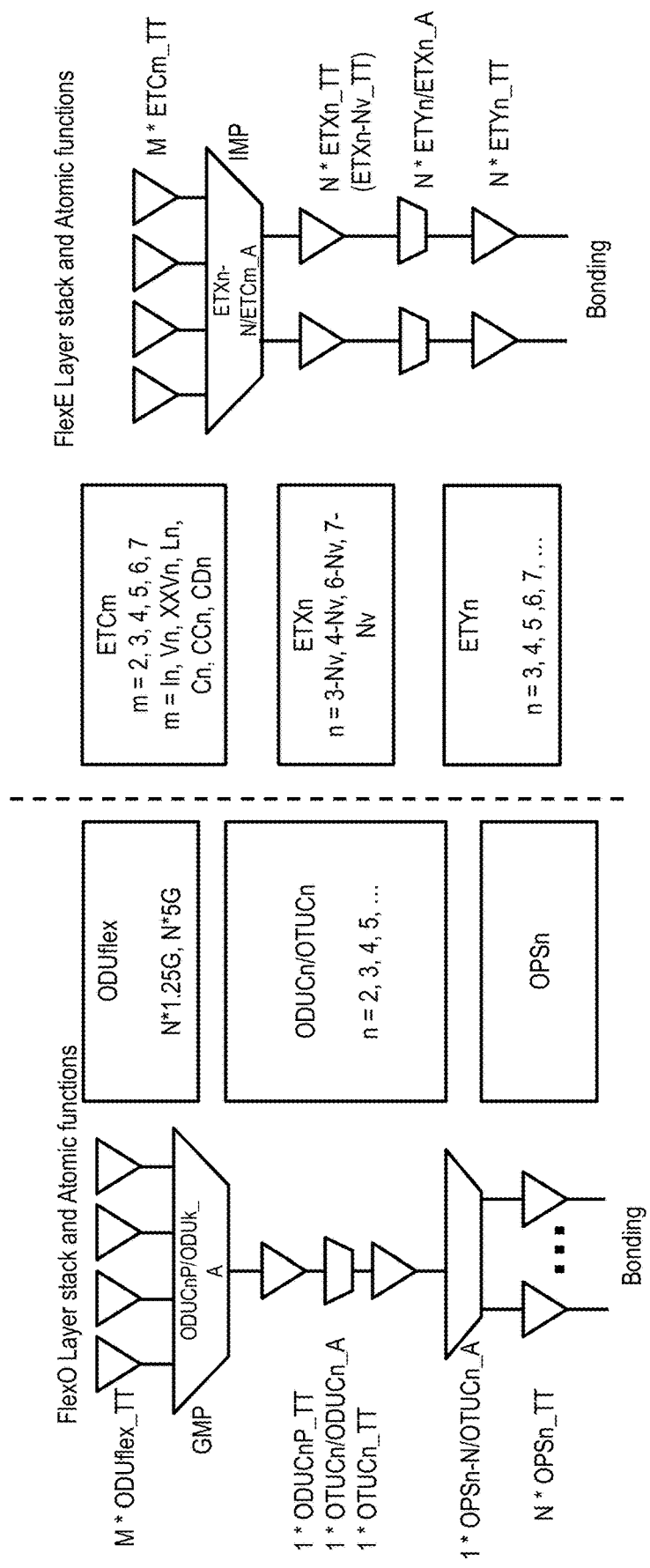
FIG. 15 is a diagram of a comparison between the layer stack and atomic functions of FlexO and FlexE.

Referring to FIG. 15, in an embodiment, a diagram illustrates a comparison between the layer stack and atomic functions of FlexO and FlexE. Of note, FlexO and FlexE are converging and look alike in the layer stack and atomic functions. In various embodiments, the systems and methods described herein contemplate FlexE as becoming the next B100G multiplexed structure. For example, map Low Order (LO) Optical channel Data Unit-j (ODUj), High Order (HO) Optical channel Data Unit-k (ODUk) and ETY right into a FlexE shim 16. The FlexE group 12 can be a section layer, and the FlexE client 14 (the 64b/66b stream, which could be OTN) can become a switchable Operations, Administration, and Maintenance (OAM) service.

FlexE PTP—Conventional

Figure 16:
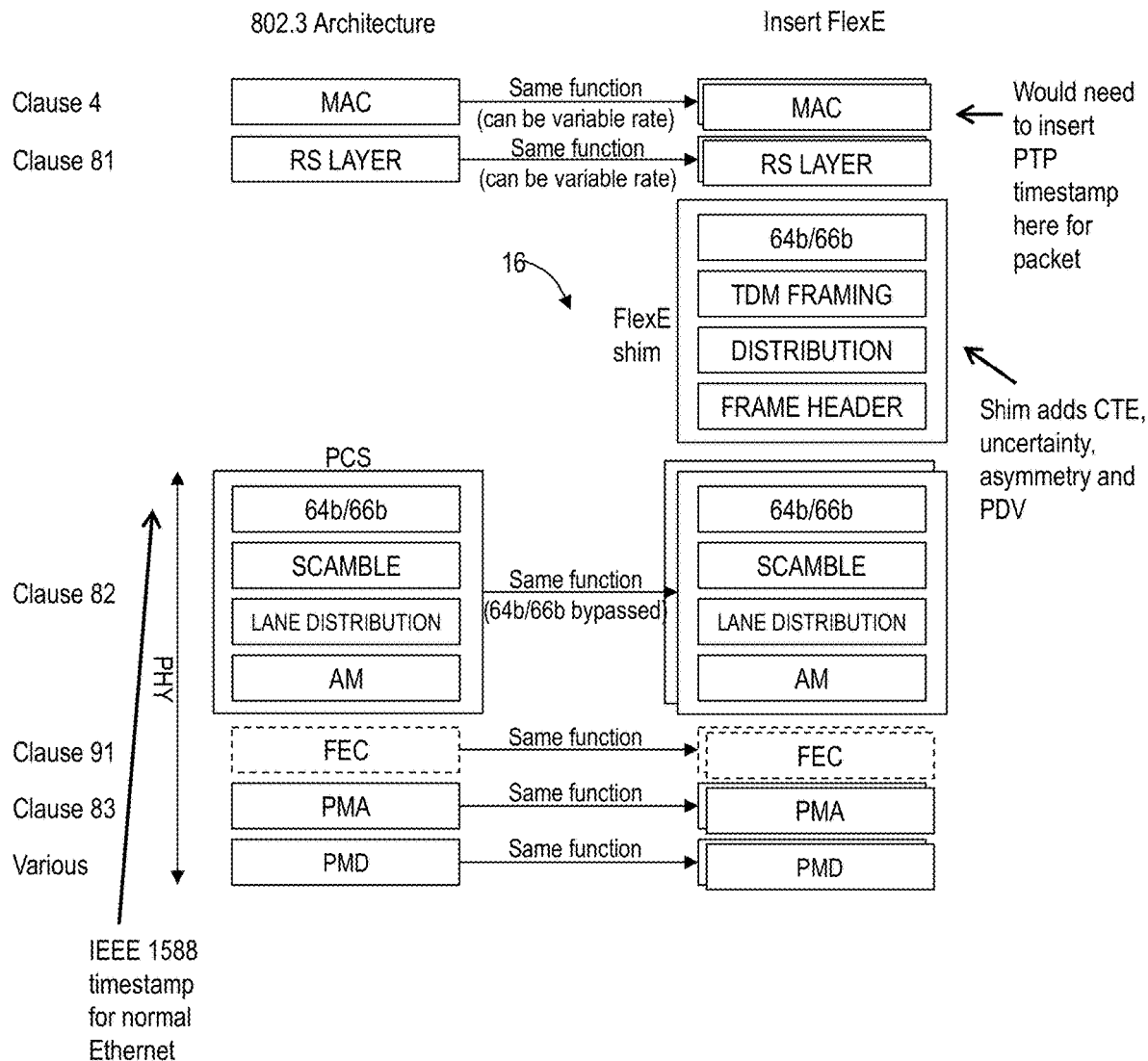
FIG. 16 is a logical diagram of the IEEE 802.3 stack and problems carrying standard PTP according to IEEE 1588.

Referring to FIG. 16, a logical diagram illustrates the IEEE 802.3 stack and problems carrying standard PTP according to IEEE 1588 defined methods. Conventional IEEE 1588 would be inserted at the MAC level and adjusted at the PHY level. The problem with FlexE is that the PHY would not be able to adjust the timestamp given that it would be presented with various packet streams into a FlexE shim. FlexE implementation would require timestamps to be inserted at the FlexE client MAC level and would add Constant Time Error (CTE), uncertainty, asymmetry, and Packet Delay Variation (PDV). Specifically, FlexE Client adaptation and mapping to the FlexE shim is not timing transparent. The process of idle insertion and removal contributes to PDV, and adaptation contributes to CTE and uncertainty for the PTP process. In order for systems/nodes to terminate PTP in a Boundary Clock (BC) topology, the systems/nodes must terminate FlexE clients. This is a complication for systems/nodes that are not aware of variable size and variable amount of FlexE clients.

FlexE PTP

Figure 17:
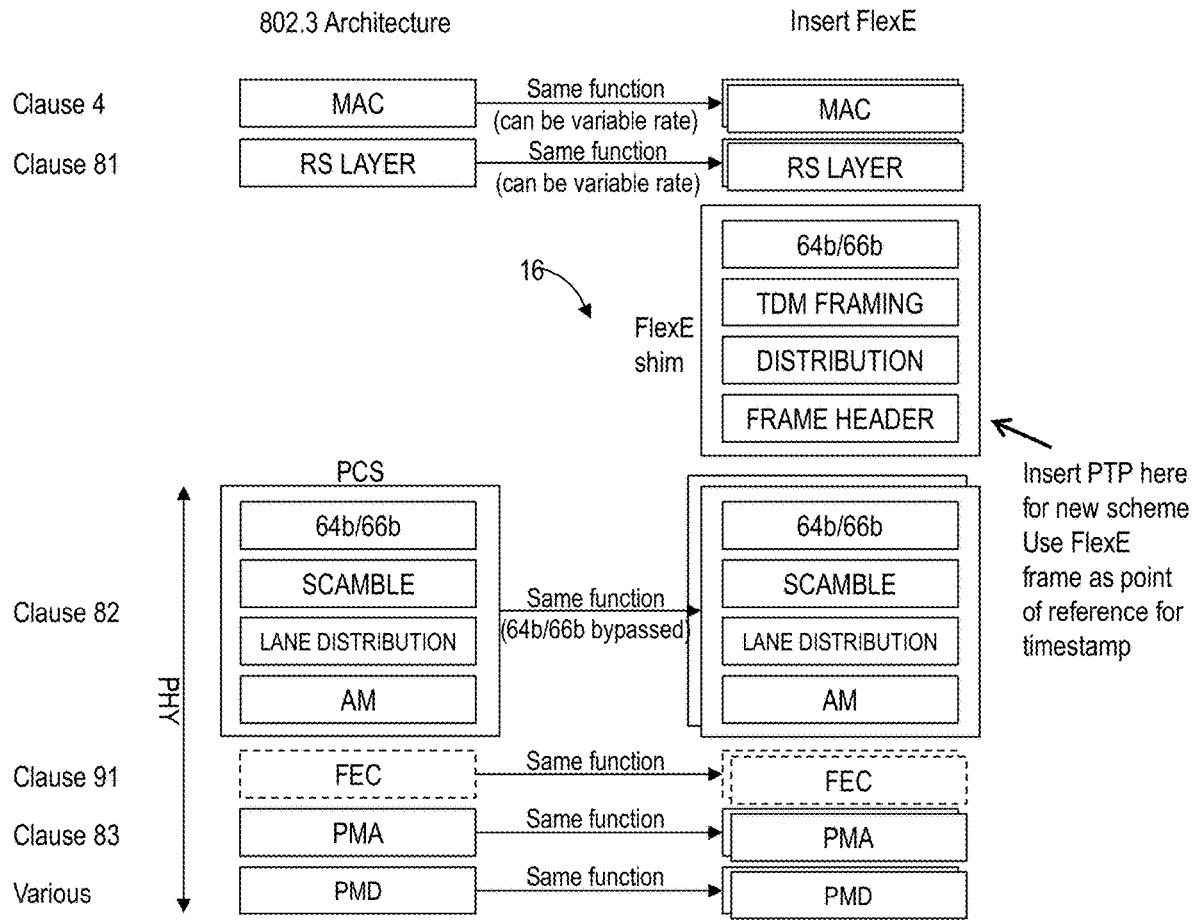
FIG. 17 is a logical diagram of the IEEE 802.3 stack and where the time transfer systems and methods locate PTP in the FlexE shim.

Referring to FIG. 17, in an embodiment, a logical diagram illustrates the IEEE 802.3 stack and where the time transfer systems and methods locate PTP. Specifically, the time transfer systems and methods insert PTP messages in the FlexE frame header and use the FlexE TDM frame structure boundaries as a point of reference for timestamps.

Figure 18:
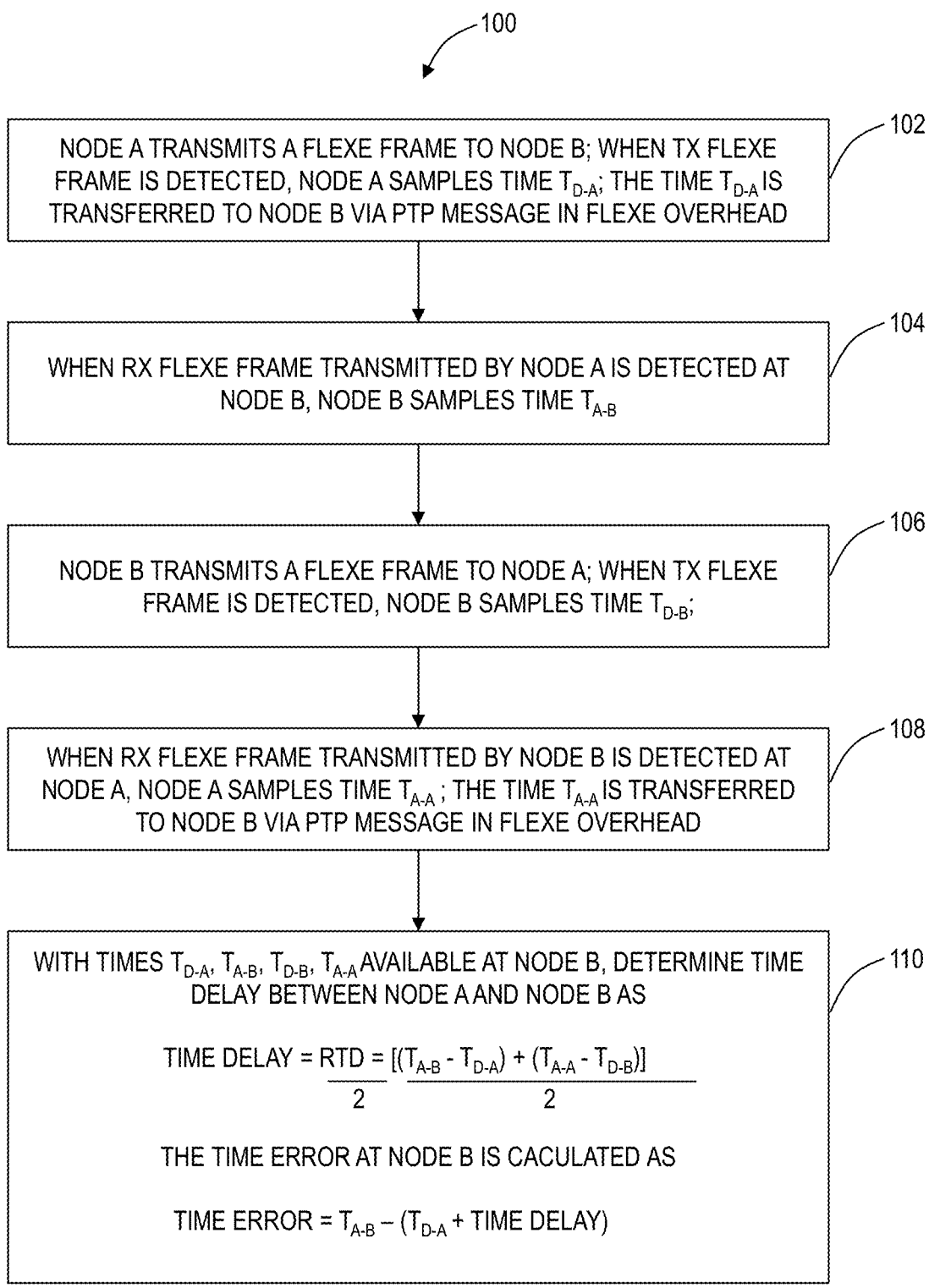
FIG. 18 is a flowchart of a time transfer process in FlexE.

Referring to FIG. 18, in an embodiment, a flowchart illustrates a time transfer process 100 in FlexE. The time transfer process 100 uses a fixed FlexE (multi)frame boundary or an overhead toggling/counting bit as a reference for timestamp generation. The reference must be reliably detected (post-Forward Error Correction (FEC) processing) at given intervals. The time of detection becomes the time reference point or "significant instant" for the time transfer process 100. The time reference point is post adaptation/mapping processing in the transmit (TX) direction and pre adaptation/mapping in the receive (RX) direction to minimize the uncertainty and jitter introduced by such blocks.

The time reference point used to indicate an Arrival Time is $T_A$ using RX frame boundaries and Departure Time $T_D$ using TX frame boundaries. The PMD/PHY layers in the stack are Constant Bit Rate (CBR) and not significant contributors to CTE. The period for time reference point in the time transfer process 100 must allow for the transfer of the timing information via a sync message channel, which can either use a reserved FlexE OH field or share the existing management channel.

The time transfer process 100 is described between two nodes—node A and node B utilizing a FlexE interface. The node A transmits a FlexE frame towards node B; when the transmit FlexE frame is detected, node A samples time $T_{D-A}$; the time $T_{D-A}$ is transferred to the node B via a PTP message in the FlexE overhead (step 102). When the receive FlexE frame transmitted by node A is detected at node B, node B samples time $T_{A-B}$ (step 104). Node B transmits a FlexE frame to node A; when the transmit frame is detected, node B samples time $T_{D-B}$ (step 106). When the receive frame transmitted by node B is detected at node A; node A samples time $T_{A-A}$; the time $T_{A-A}$ is transferred to node B via a PTP message in the FlexE overhead (step 108). With times $T_{D-A}$, $T_{A-B}$, $T_{D-B}$, $T_{A-A}$ available at node B, the time delay between node A and node B is determined as:

$$\text{TIME\_DELAY} = \frac{RTD}{2} = \frac{[(T_{A-B} - T_{D-A}) + (T_{A-A} - T_{D-B})]}{2}$$

Where RTD is the Round Trip Delay which is $[(T_{A-B}-T_{D-A})+(T_{A-A}-T_{D-B})]$. The time error at node B is calculated as:

$$\text{TIME\_ERROR} = T_{A-B} - (T_{D-A} + \text{TIME\_DELAY}) \quad \text{(step 110)}.$$

Control algorithms and fixed known offsets can then be employed to minimize the time error.

Figure 19:
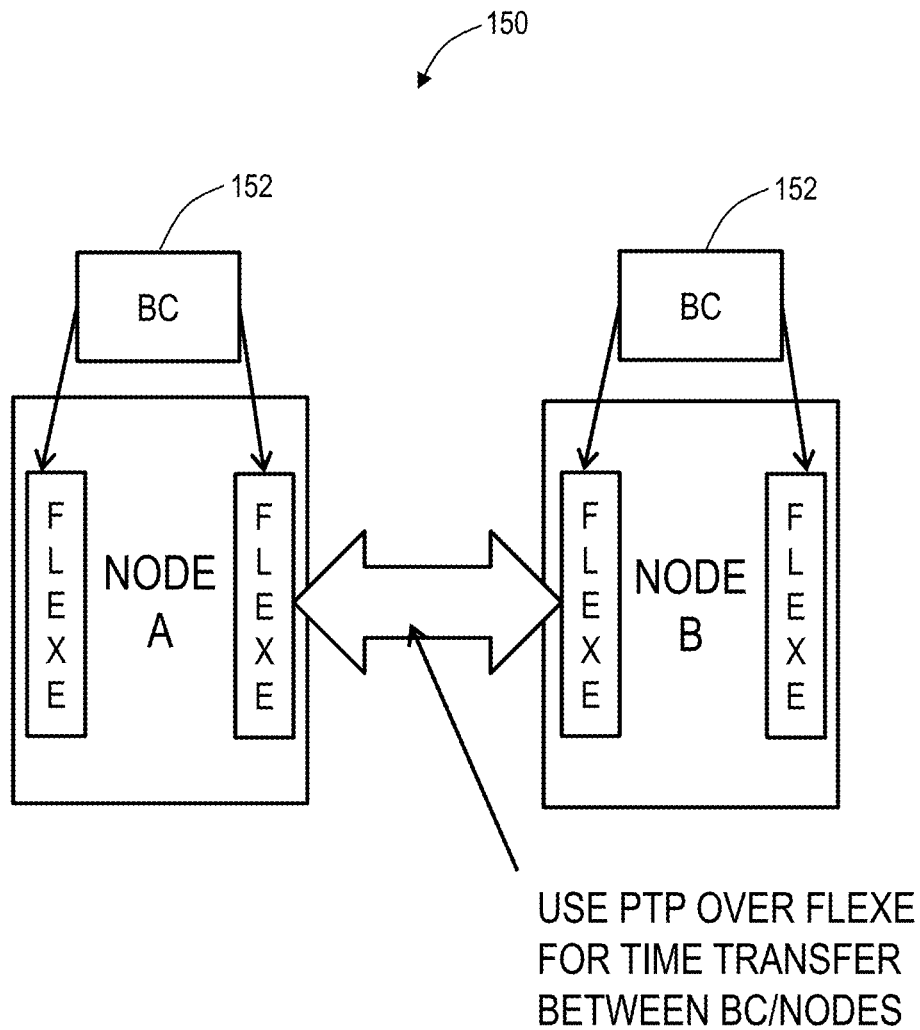
FIG. 19 is a diagram of a network with node A and node B connected to one another via FlexE.

Referring to FIG. 19, in an embodiment, a network diagram illustrates a network 150 with node A and node B connected to one another via a FlexE interface. Specifically, the time transfer process 100 uses FlexE interfaces between boundary clocks 152 and does not rely on FlexE clients. The boundary clock 152 is an IEEE 1588 component that allows the synchronization of IEEE 1588 clocks across subnets defined by a router or other devices that blocks the transmission of all IEEE 1588 messages. The boundary clock 152 serves to eliminate the large fluctuations in communication latency typically generated by routers and similar devices.

FlexE Sync Messages

In the time transfer process 100, messages are provided between nodes to relay the various time measurements. For example, in the time transfer process 100, the node A transfers the times $T_{D-A}$, $T_{A-A}$ to the node B. In an embodiment, the time transfer process 100 can use the reserved area in the FlexE overhead multiframe (FlexE shim overhead) for inserting these PTP messages. In another embodiment, the time transfer process 100 can use the existing management channel for inserting these PTP messages. The management channel can use a Generic Framing Procedure—Framed (GFP-F)/High-Level Data Link Control (HDLC)/Ethernet encapsulation with some type of packet differentiation (i.e. GFP UPI).

FlexE Timestamp Point of Reference

Figure 20:
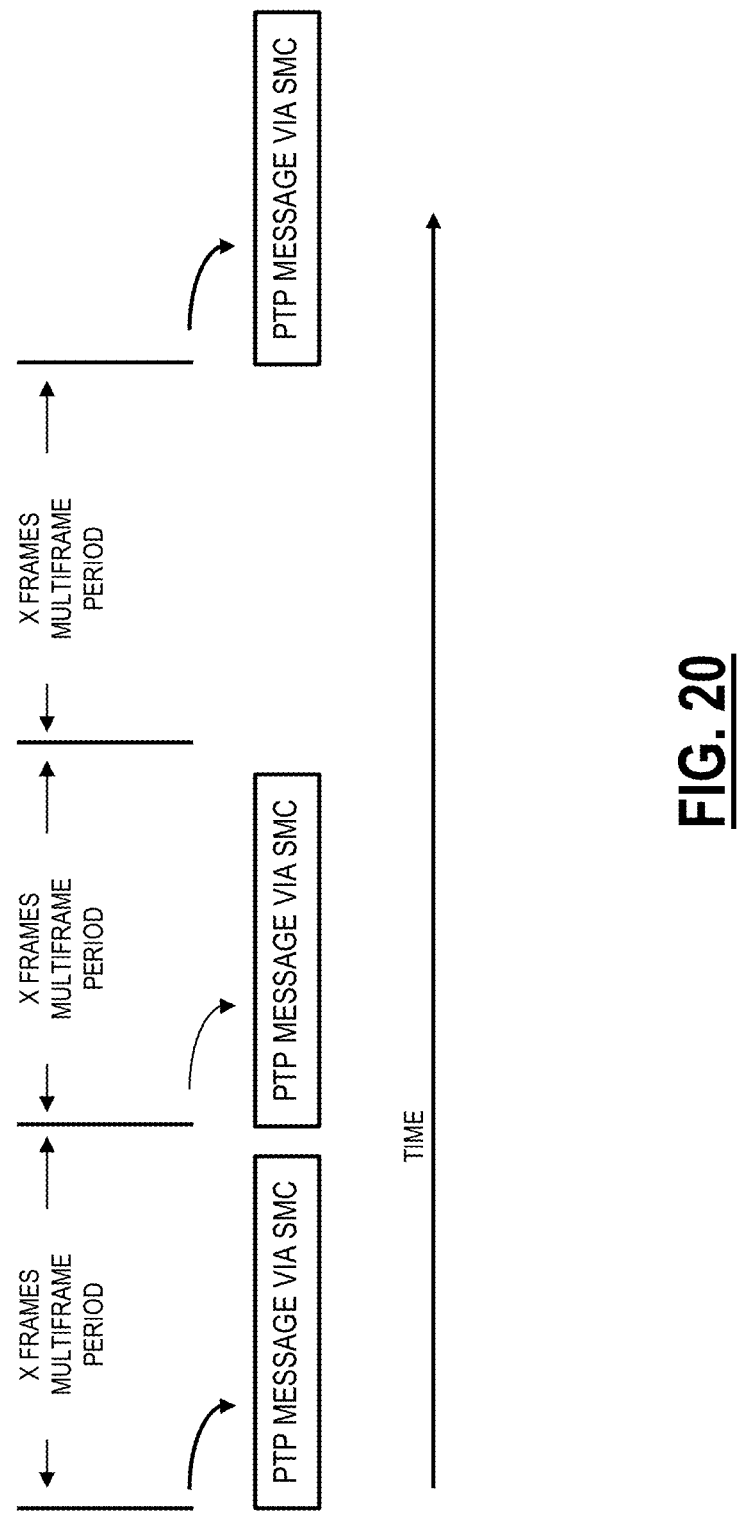
FIGS. 20 and 21 are block diagrams of a FlexE timestamp point of reference.
Figure 21:
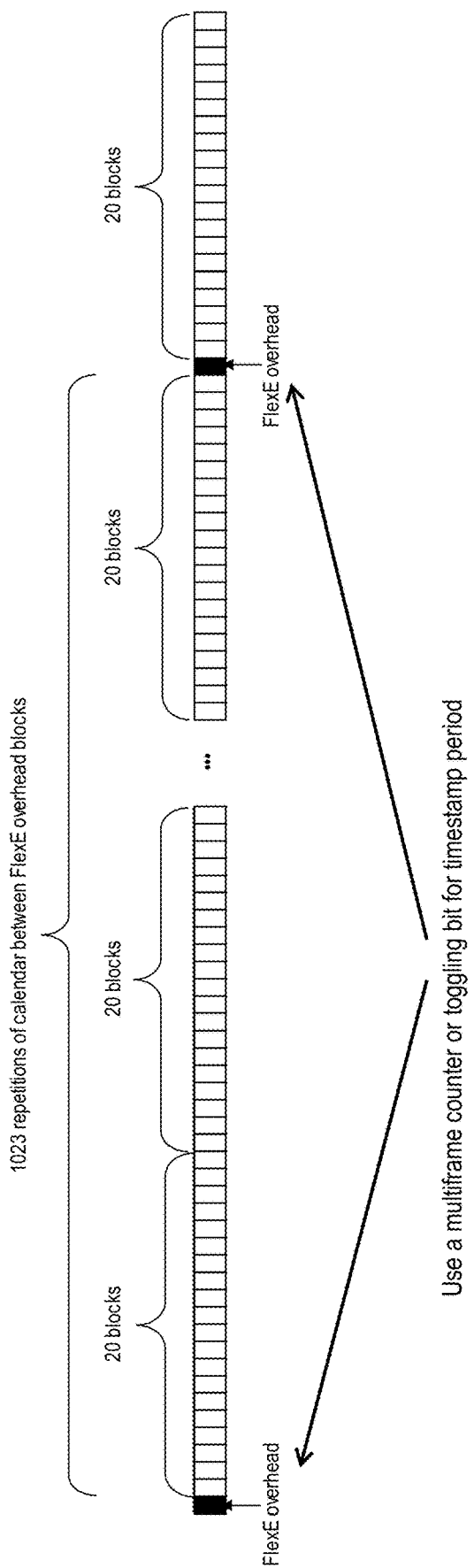

Referring to FIGS. 20 and 21, in embodiments, block diagrams illustrate a FlexE timestamp point of reference. FIG. 20 illustrates FlexE frame or multiframe boundaries for use as a point of reference in timestamp calculations. The FlexE frame is CBR and deterministic, thus, uses the FlexE frame or multiframe boundaries as the point of reference will not contribute to significant CTE. FIG. 21 illustrates the FlexE overhead on each PHY of the FlexE group from FIG. 7. Again, the time transfer process 100 can use the multiframe boundary or a toggling in FlexE OH to signal the timestamp point of reference.

Time Transfer Method

Figure 22:
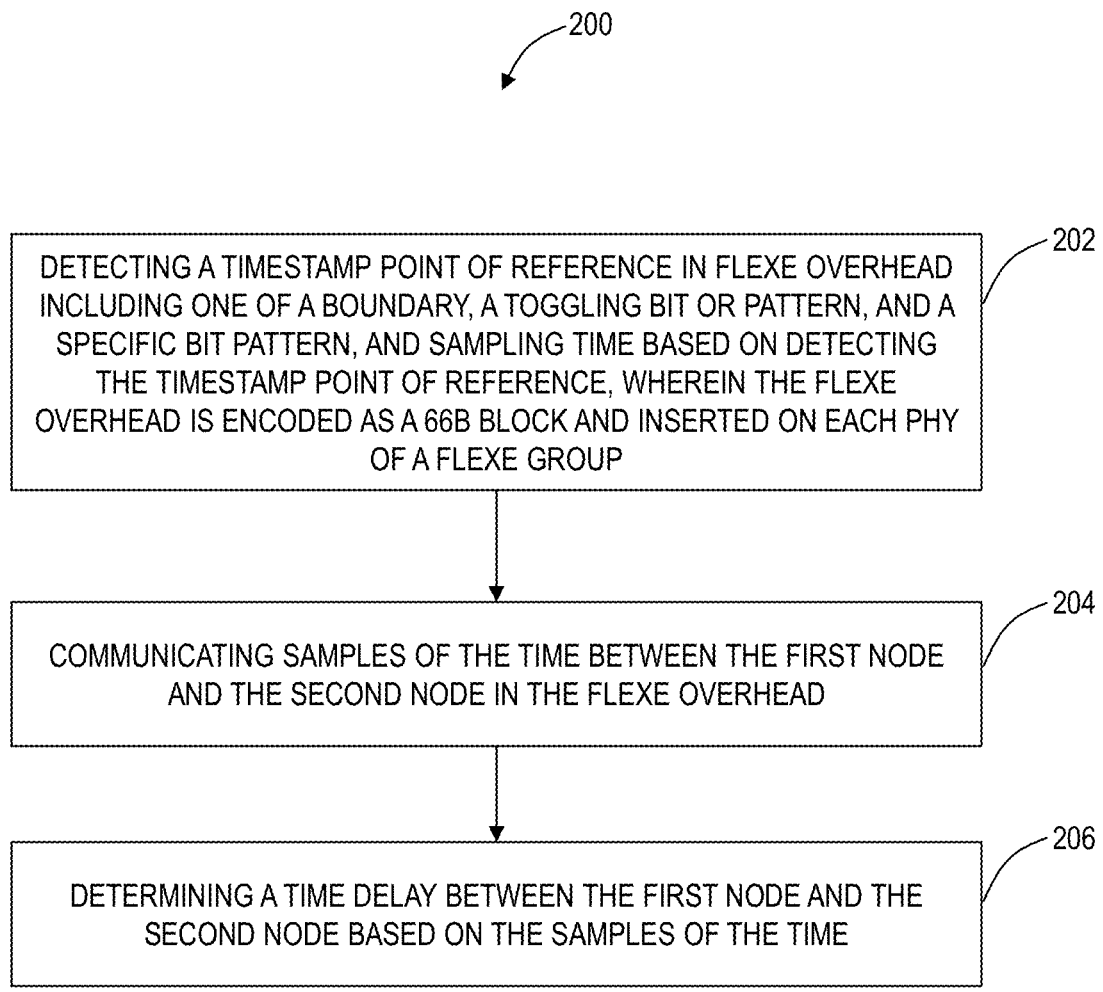
FIG. 22 is a flowchart illustrates a time transfer method in Flexible Ethernet (FlexE) between a first node and a second node.

Referring to FIG. 22, in an embodiment, a flowchart illustrates a time transfer method 200 in Flexible Ethernet (FlexE) between a first node and a second node. The time transfer method 200 includes detecting a timestamp point of reference in FlexE overhead including one of a boundary, a toggling bit or pattern, and a specific bit pattern, and sampling time based on detecting the timestamp point of reference, wherein the FlexE overhead is encoded as a 66b block and inserted on each PHY of a FlexE group (step 202); communicating samples of the time between the first node and the second node in the FlexE overhead (step 204); and determining a time delay between the first node and the second node based on the samples of the time (step 206). The timestamp point of reference can be one of a frame and multiframe boundary associated with FlexE frame TDM structure. The timestamp point of reference can be a toggling bit in the FlexE overhead. The timestamp point of reference is determined post adaptation/mapping processing in a transmit direction and pre adaptation/mapping in a receive direction. Step 204 can be performed using a reserved area in the FlexE overhead or using a management channel in the FlexE overhead. The samples can include $T_{A-B}$ which is an arrival time in a receive direction at the second node, $T_{D-A}$ which is a departure time in a transmit direction at the first node, $T_{A-A}$ which is an arrival time in a receive direction at the first node, and $T_{D-B}$ which is a departure time in a transmit direction at the second node. A Round Trip Delay is $[(T_{A-B}-T_{D-A})+(T_{A-A}-T_{D-B})]$, time delay TD is RTD/2, and a time error at the second node relative to the first node is $T_{A-B}-(T_{D-A}+\text{TD})$.

In another embodiment, a node configured to switch a Flexible Ethernet (FlexE) client service in a network includes circuitry configured to detect a timestamp point of reference in FlexE overhead including one of a boundary, a toggling bit or pattern, and a specific bit pattern, and to sample time based on detection of the timestamp point of reference, wherein the FlexE overhead is encoded as a 66b block and inserted on each PHY of a FlexE group; circuitry configured to communicate samples of the time, with a second node, in the FlexE overhead; and circuitry configured to determine a time delay to the second node based on the samples of the time.

In a further embodiment, a node utilizing Flexible Ethernet (FlexE) and configured to determine time transfer to a second node includes circuitry configured to obtain a first time sample from the second node based on a first timestamp point of reference in FlexE overhead detected at the second node, wherein the FlexE overhead is encoded as a 66b block and inserted on each PHY of a FlexE group; circuitry configured to detect a second time sample based on a second timestamp point of reference in the FlexE overhead, wherein the first timestamp point of reference and the second timestamp point of reference include one of a boundary, a toggling bit or pattern, and a specific bit pattern in the FlexE overhead; and circuitry configured to determine a time delay to the second node based on the first time sample and the second time sample.

It will be appreciated that some embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A time transfer method implemented in a first node, the time transfer method comprising:
   communicating a sequence of encoded blocks with a second node; and
   communicating synchronization messages that include Precision Time Protocol (PTP) messages with the second node via a synchronization message channel in flexible ethernet overhead associated with the sequence of encoded blocks, wherein the synchronization messages are utilized for synchronization of a clock at the second node.

2. The time transfer method of claim 1, wherein each block in the sequence of encoded blocks is one of a data block and an overhead block.

3. The time transfer method of claim 2, wherein each block in the sequence of encoded blocks is distributed based on a calendar.

4. The time transfer method of claim 2, wherein the synchronization message channel is via reserved fields in the overhead.

5. The time transfer method of claim 2, wherein the synchronization message channel is via a management channel in the overhead.

6. The time transfer method of claim 1, wherein a timestamp point of reference for use in the synchronization messages includes a designated boundary between a pair of adjacent blocks, and wherein the designated boundary is based on a frame structure for blocks in the sequence of encoded blocks.

7. The time transfer method of claim 1, wherein the sequence of encoded blocks are encoded based on 64b/66b encoding.

8. A node comprising:
   one or more ports including a port configured to communicate with a second node; and
   circuitry configured to
      communicate a sequence of encoded blocks with a second node, and
      communicate synchronization messages that include Precision Time Protocol (PTP) messages with the second node via a synchronization message channel in flexible ethernet overhead associated with the sequence of encoded blocks, wherein the synchronization messages are utilized for synchronization of a clock at the second node.

9. The node of claim 8, wherein each block in the sequence of encoded blocks is one of a data block and an overhead block.

10. The node of claim 9, wherein each block in the sequence of encoded blocks is distributed based on a calendar.

11. The node of claim 9, wherein the synchronization message channel is via reserved fields in the overhead.

12. The node of claim 9, wherein the synchronization message channel is via a management channel in the overhead.

13. The node of claim 8, wherein a timestamp point of reference for use in the synchronization messages includes a designated boundary between a pair of adjacent blocks, and wherein the designated boundary is based on a frame structure for blocks in the sequence of encoded blocks.

14. The node of claim 8, wherein the sequence of encoded blocks are encoded based on 64b/66b encoding.

15. A non-transitory computer-readable storage medium having computer readable code stored thereon for programming a first node to perform steps of:
   communicating a sequence of encoded blocks with a second node; and
   communicating synchronization messages that include Precision Time Protocol (PTP) messages with the second node via a synchronization message channel in flexible ethernet overhead associated with the sequence of encoded blocks, wherein the synchronization messages are utilized for synchronization of a clock at the second node.

16. The non-transitory computer-readable storage medium of claim 15, wherein each block in the sequence of encoded blocks is one of a data block and an overhead block.

17. The non-transitory computer-readable storage medium of claim 15, wherein a timestamp point of reference for use in the synchronization messages includes a designated boundary between a pair of adjacent blocks, and wherein the designated boundary is based on a frame structure for blocks in the sequence of encoded blocks.

18. The non-transitory computer-readable storage medium of claim 15, wherein the sequence of encoded blocks are encoded based on 64b/66b encoding.

\* \* \* \* \*